(12) United States Patent
Yasuda

(10) Patent No.: US 7,626,291 B2
(45) Date of Patent: Dec. 1, 2009

(54) DRIVE APPARATUS

(75) Inventor: Hiromu Yasuda, Kawasaki (JP)

(73) Assignee: Canon Kabushiki Kaisha (JP)

( * ) Notice: Subject to any disclaimer, the term of this patent is extended or adjusted under 35 U.S.C. 154(b) by 223 days.

(21) Appl. No.: 11/766,842

(22) Filed: Jun. 22, 2007

(65) Prior Publication Data
US 2007/0296312 A1 Dec. 27, 2007

(30) Foreign Application Priority Data
Jun. 26, 2006 (JP) .............. 2006-175210

(51) Int. Cl.
H02K 37/14 (2006.01)
H02K 21/12 (2006.01)

(52) U.S. Cl. .............. 310/49 R; 310/156.39

(58) Field of Classification Search .......... 310/49 R, 310/112, 180–181, 216, 254, 156.11, 156.39, 310/216.111–216.112
See application file for complete search history.

(56) References Cited

U.S. PATENT DOCUMENTS

| | | | | |
|---|---|---|---|---|
| 3,479,539 A | * | 11/1969 | Brion | .......... 310/49 R |
| 4,767,958 A | * | 8/1988 | Sasaki | .......... 310/257 |
| 5,925,945 A | * | 7/1999 | Aoshima | .......... 310/49 R |
| 6,172,440 B1 | * | 1/2001 | Sasaki et al. | .......... 310/156.02 |
| 6,876,109 B2 | * | 4/2005 | Matsushita et al. | .......... 310/49 R |
| 7,173,352 B2 | * | 2/2007 | Aoshima | .......... 310/49 R |

FOREIGN PATENT DOCUMENTS

| | | |
|---|---|---|
| JP | 09-331666 A | 12/1997 |
| JP | 2002-051526 A | 2/2002 |
| JP | 2005-204453 A | 7/2005 |

* cited by examiner

*Primary Examiner*—Tran N Nguyen
(74) *Attorney, Agent, or Firm*—Rossi, Kimms & McDowell, LLP

(57) ABSTRACT

A drive apparatus having a shortened axial dimension. First and second magnets are each formed into a semi-cylindrical shape and each provided with a magnetized pattern portion. A rotor yoke includes a shaft portion and a magnetic pole portion facing magnetized surfaces of the magnets. First and second stator yokes are each disposed to cooperate with the rotor yoke to sandwich therebetween a part of the first or second magnet where the magnetized pattern portion is formed. First and second coils each magnetize a part of the magnetic pole portion of the rotor yoke which faces the first or second stator yoke.

16 Claims, 24 Drawing Sheets

DRIVE APPARATUS

BACKGROUND OF THE INVENTION

1. Field of the Invention

The present invention relates to a drive apparatus, and more particularly, to a drive apparatus having a shortened axial dimension.

2. Description of the Related Art

Conventionally, stepping motors have been widely used as driving sources for various apparatuses. As a first exemplified prior art, there has been proposed a stepping motor which is small in diameter around a rotating shaft of the motor and has a high output (see Japanese Laid-Open Patent Publication No. 09-331666, for example).

FIG. 21 is an exploded perspective view showing components of the stepping motor according to the first exemplified prior art, and FIG. 22 is a sectional view showing the axial construction of the stepping motor in an assembled state.

In FIGS. 21 and 22, the stepping motor includes a magnet 101, a first coil 102, a second coil 103, a first stator 104, a second stator 105, an output shaft 106, and a coupling ring 107. The magnet 101 is formed into a cylindrical shape and circumferentially divided into four pieces, which are alternately magnetized to different polarities.

In the stepping motor having the above described construction, when electric power is supplied to the first coil 102 which is thereby energized, a first magnetic circuit is formed that passes through a first outer magnetic pole 104A, a first inner magnetic pole 104C, and the magnet 101. When the second coil 103 is energized, a second magnetic circuit is formed that passes through a second outer magnetic pole 105A, a second inner magnetic pole 105C, and the magnet 101. By changing magnetic fluxes flowing though the first and second magnetic circuits, a force acting on the magnet 101 is caused to change, whereby a rotor formed by the magnet 101 and the output shaft 106 is rotated.

In the stepping motor according to the first exemplified prior art, gaps between the first and second magnetic circuits are present only between the outer magnetic poles and the magnet 101 and between the magnet 101 and the inner magnetic poles, and therefore, the magnetic circuits have a reduced magnetic resistance. Furthermore, fluxes efficiently act on the magnet 101 between the outer and inner magnetic poles. As a result, stronger magnetic fluxes can be generated with less electric current, whereby the output of the stepping motor can be increased.

A stepping motor according to a second exemplified prior art is formed into a hollow cylindrical shape while having magnetic circuits that have the same construction as those of the first exemplified prior art (see, Japanese Laid-open Patent Publication No. 2002-51526, for example). When mounted on a camera, the stepping motor of this type is disposed parallel to the optical axis in a lens barrel of the camera, with a diaphragm blade, a shutter, lenses, and the like disposed on the inner-diameter side of the stepping motor. As a result, the camera has a construction that is much efficient in space utilization than in a motor of a solid construction provided with no spaces on the inner-diameter side of the motor, making it possible to decrease the diameter of the lens barrel of the camera.

The above described stepping motors according to the first and second exemplified prior arts each include a rotor formed by a permanent magnet which is large in diameter. As a result, the moment of inertia of the rotor is large, thus entailing a drawback that the response characteristic of the stepping motor is deteriorated at high-speed rotation.

To improve the response characteristic at high-speed rotation, there has been proposed a stepping motor whose stator is formed by a coil and a permanent magnet and whose rotor is formed by a yoke (see, for example, Japanese Laid-open Patent Publication No. 2005-204453).

FIG. 23 is an exploded perspective view showing components of a stepping motor according to a third exemplified prior art, and FIG. 24 is a sectional view showing the axial construction of the stepping motor in an assembled state.

Referring to FIGS. 23 and 24, the stepping motor includes a first outside yoke 207, a first inside yoke 208, a first top panel yoke 209, a second outside yoke 210, a second inside yoke 211, and a second top panel yoke 212. The stepping motor further includes a first coil 213, a second coil 214, a first magnet 215, a second magnet 216, a first rotor yoke 217, and a second rotor yoke 218.

Magnetic fluxes generated by the energized first and second coils 213, 214 flow through first and second magnetic circuits, each of which passes through the first or second outside yoke, the first or second top panel yoke, the first or second inside yoke, the first or second rotor yoke, and the first or second magnet. By changing the magnetic fluxes flowing though the first and second magnetic circuits, forces acting between the magnets and the first and second rotor yokes are caused to change, whereby a rotor formed by these rotor yokes is rotated.

With the stepping motor according to the third exemplified prior art, rotor yokes smaller in the moment of inertia than a magnet can be disposed as a rotor, while permitting the motor to have the same or similar magnetic path construction to that of the first exemplified prior art stepping motor. As a result, the response characteristic of the motor at high-speed rotation can be improved.

However, in each of the first to third exemplified stepping motors, the first and second magnetic circuits are juxtaposed to each other in the axial direction. In order to reduce the axial direction of this type of stepping motor, the distance between the first and second magnetic circuits must be decreased.

In the construction where the distance between the first and second magnetic circuits is made small, interference occurs between the magnetic circuits, causing problems that the stepping motor cannot stop at a predetermined rotary position and a cogging torque increases. To obviate this, some distance is required between the first and second magnetic circuits, making it difficult to decrease the axial dimension of the stepping motor, which causes a problem.

SUMMARY OF THE INVENTION

The present invention provides a drive apparatus having a reduced axial dimension thereof.

According to the present invention, there is provided a drive apparatus comprising a magnet including a first magnetized pattern portion circumferentially magnetized into different poles and a second magnetized pattern portion circumferentially magnetized into different poles with a phase difference relative to the first magnetized pattern portion, a rotor yoke disposed on one diametrical side of the magnet and including magnetic pole portions circumferentially formed to face the first and second magnetized pattern portions of the magnet, a first stator yoke fixed on another diametrical side of the magnet and disposed to cooperate with the rotor yoke to sandwich therebetween a part of the magnet in which the first magnetized pattern portion is formed, a second stator yoke fixed on the other diametrical side of the magnet and disposed to cooperate with the rotor yoke to sandwich therebetween a part of the magnet in which the second magnetized pattern portion is formed, a first coil adapted to energize a part of the magnetic pole portions of the rotor yoke which faces the first stator yoke, and a second coil adapted to energize apart of the magnetic pole portions of the rotor yoke facing the second stator yoke.

According the present invention, it is possible to dispose part of a first magnetic circuit through which magnetic flux generated when electric power is supplied to the first coil and part of a second magnetic circuit through which magnetic flux generated when electric power is supplied to the second coil, so as to be circumferentially juxtaposed to each other. As compared to the prior art examples in which first and second magnetic circuits are axially juxtaposed to each other, it is possible to realize a drive apparatus having a shortened axial size.

Further features of the present invention will become apparent from the following description of exemplary embodiments with reference to the attached drawings.

DETAILED DESCRIPTION OF THE PREFERRED EMBODIMENTS

The present invention will now be described in detail below with reference to the drawings showing preferred embodiments thereof.

First Embodiment

Figure 1:
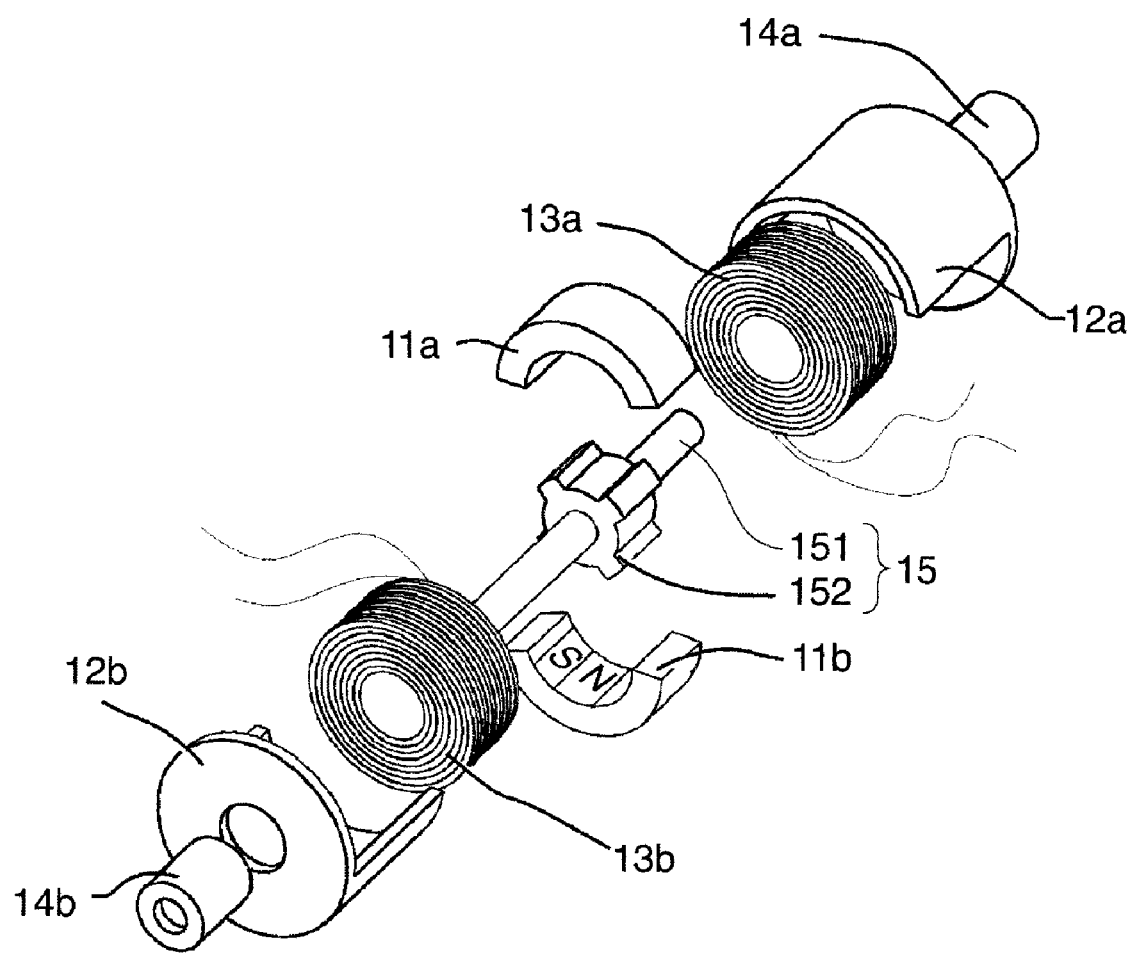
FIG. 1 is an exploded perspective view showing components of a stepping motor as a drive apparatus according to a first embodiment of the present invention.
Figure 2:
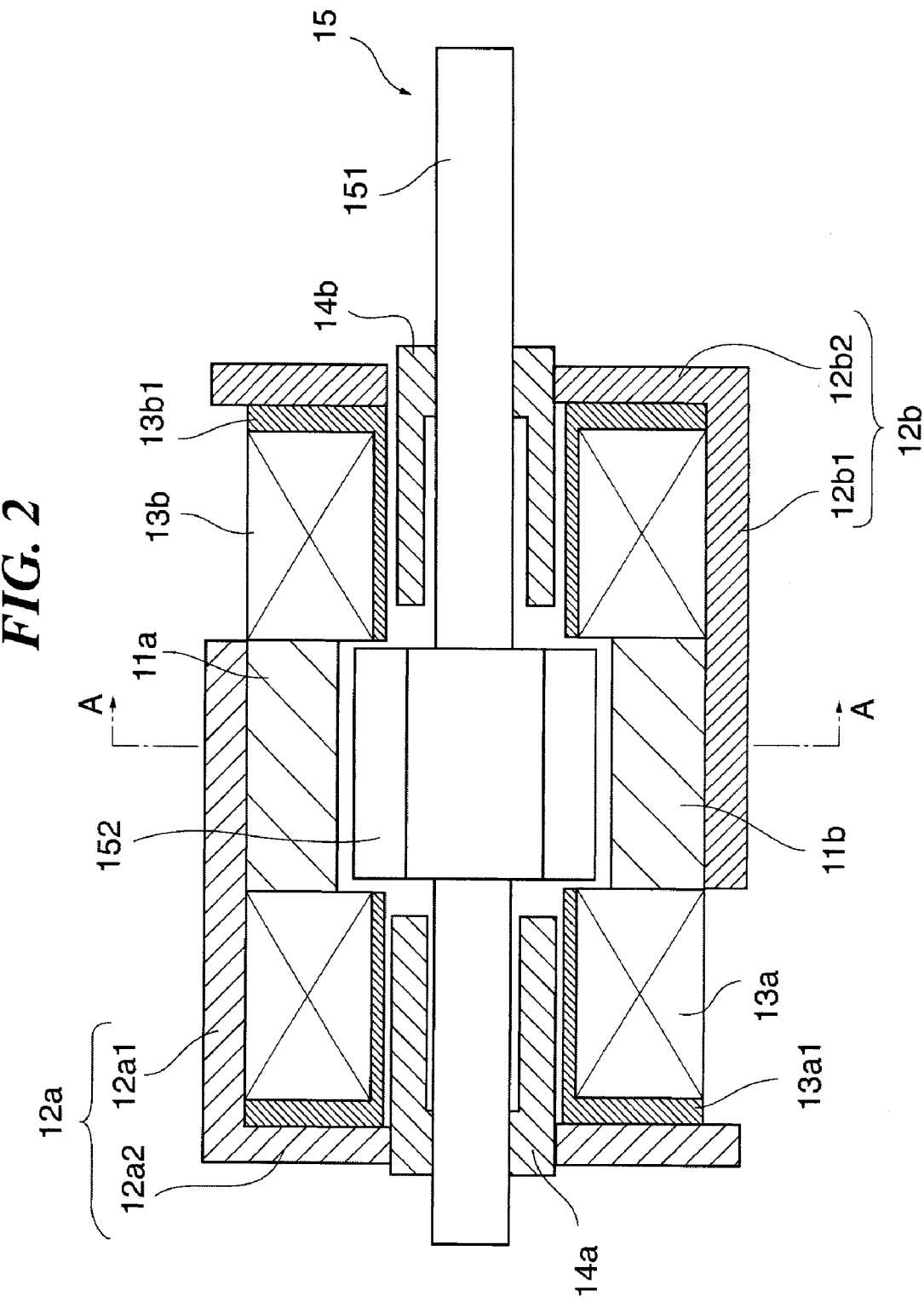
FIG. 2 is a sectional view showing the construction of the stepping motor in an assembled state.
Figure 3:
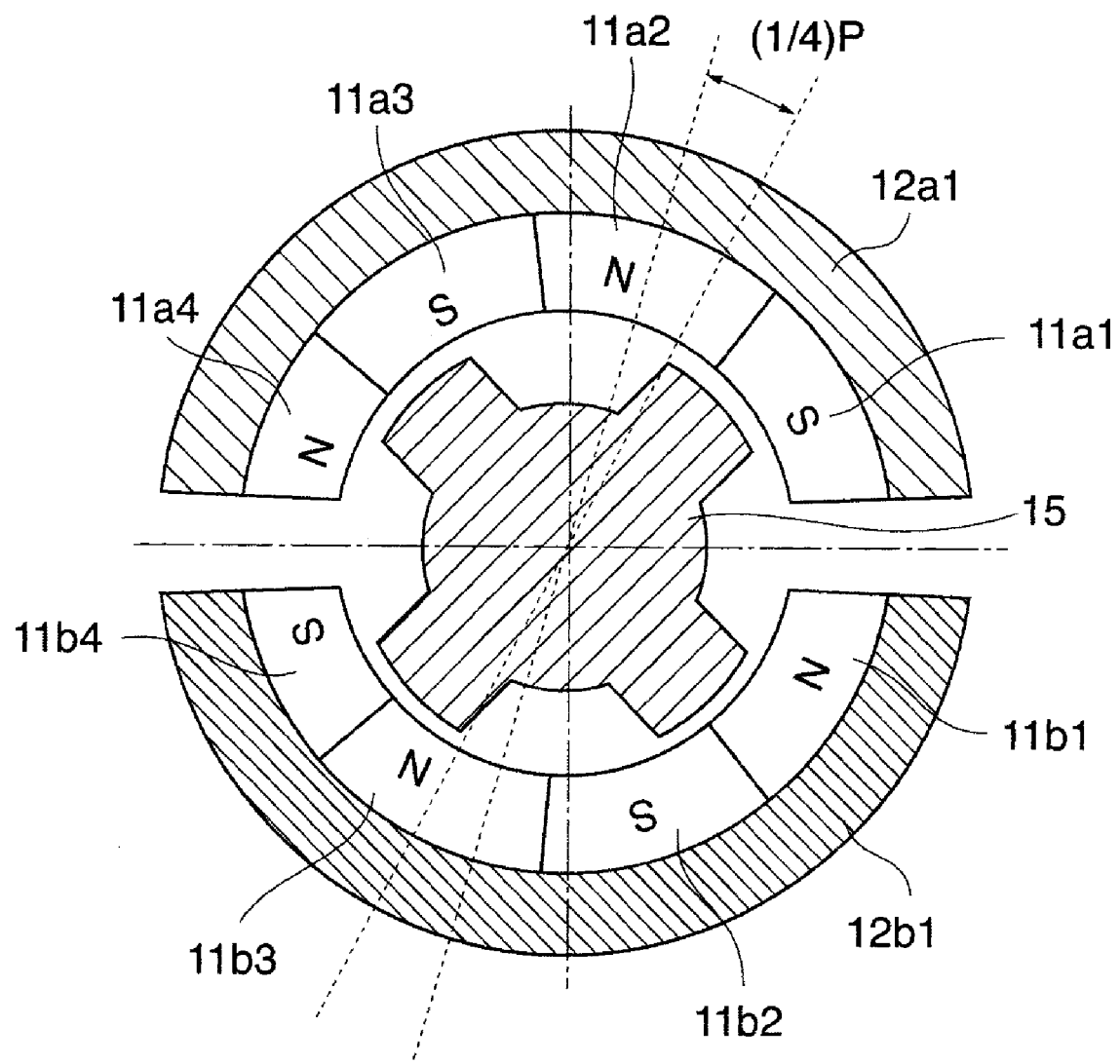
FIG. 3 is a sectional view taken along line A-A in FIG. 2 and showing the construction of the stepping motor.

FIG. 1 is an exploded perspective view showing components of a stepping motor as a drive apparatus according to a first embodiment of the present invention, FIG. 2 is a sectional view showing the axial construction of the stepping motor in an assembled state, and FIG. 3 is a sectional view showing the construction of the stepping motor taken along line A-A in FIG. 2.

Referring to FIGS. 1 to 3, the stepping motor includes a first magnet 11a, a second magnet 11b, a first stator yoke 12a, and a second stator yoke 12b. The stepping motor further includes a first coil 13a, a second coil 13b, a first bearing 14a, a second bearing 14b, and a rotor yoke 15.

For ease of explanation of the first magnet 11a, a first imaginary magnet formed into a cylindrical shape is considered. The first imaginary magnet has an inner peripheral surface thereof divided into n pieces (where n is an even number equal to 4 or more, and is 8 in this embodiment) which are alternately magnetized into S poles and N poles. The first imaginary magnet has an outer peripheral surface thereof having a magnetized distribution that is weaker than that of the inner peripheral surface or is not magnetized or is magnetized in polarity opposite to that of the inner peripheral surface. The cylindrical first imaginary magnet is divided into two pieces along the axial direction thereof, one of which forms the first magnet 11a. The first magnet 11a includes magnetic pole portions 11a1 to 11a4 forming magnetized pattern portions which will be described later.

As with the first magnet 11a, the second magnet 11b is formed by one of two semi-cylindrical pieces into which a cylindrical second imaginary magnet is divided along the axial direction thereof, an inner peripheral surface of the second imaginary magnet being alternately magnetized into S poles and N poles.

The first stator yoke 12a, which is made of a soft magnetic material, is formed by a semi-cylindrical magnetic pole portion 12a1 and a circular disk-shaped top panel portion 12a2. The magnetic pole portion 12a1 of the rotor yoke 12a is formed to have an inner diameter thereof nearly equal in dimension to the outer diameter of the first magnet 11*a*, and is disposed to cover the outer periphery of the first magnet 11*a* as shown in FIG. 3.

The top panel portion 12*a*2 of the first stator yoke 12*a* is formed to have an outer diameter thereof nearly equal to the magnetic pole portion 12*a*1, and a hole in which the first bearing 14*a* is supported is formed at the center of the top panel portion 12*a*2. The first stator yoke 12*a* is disposed to cooperate with the rotor yoke 15 to sandwich therebetween the magnetized pattern portions of the first magnet 11*a*.

A second stator yoke 12*b* is made of the same material and formed into the same shape as with the first stator yoke 12*a*. Specifically, the second stator yoke 12*b* is made of a soft magnetic material and formed by a semi-cylindrical magnetic pole portion 12*b*1 and a circular disk-shaped top panel portion 12*b*2. The magnetic pole portion 12*b*1 of the second stator yoke 12*b* is formed to have an inner diameter thereof nearly equal in dimension to the outer diameter of the second magnet 11*b*, and is disposed to cover the outer periphery of the second magnet 11*b* as shown in FIG. 3.

The top panel portion 12*b*2 of the second stator yoke 12*b* is formed to have an outer diameter nearly equal to the magnetic pole portion 12*b*1, and a hole in which the second bearing 14*b* is supported is formed at the center of the top panel portion 12*b*2.

The first coil 13*a* is formed by a first bobbin 13*a*1 around which an electrically conductive wire is wound a large number of times, the first bobbin being disposed around the center axis of the rotor yoke 15. The first coil 13*a* is formed to have an outer diameter thereof nearly equal to the outer diameter of the first and second magnets 11*a*, 11*b*.

The shape, the number of times of winding, and the resistance of the second coil 13*b* are the same as or similar to those of the first coil 13*a*. Specifically, the second coil 13*b* disposed around the center axis of the rotor yoke 15 is formed by a second bobbin 13*b*1 around which an electrical conductive wire is wound a large number of times. The second coil 13*b* is formed to have an outer diameter thereof nearly equal to the diameter of the first and second magnets 11*a*, 11*b*.

The first bearing 14*a* is formed into a cylindrical shape and has an inner diameter portion for supporting the rotor yoke 15 for rotation. It is preferable that the first bearing 14*a* be formed by a soft magnetic material so as to be utilized as part of a magnetic path. Preferably, the first bearing 14*a* be formed by an oil-containing sintered bearing made of iron powder, so as to permit magnetic flux to pass therethrough while reducing shaft friction.

The second bearing 14*b* is the same or similar in shape to the first bearing 14*a*. Specifically, the second bearing 14*b* is formed into a cylindrical shape, and has an inner diameter portion thereof for supporting the rotor yoke 15 so as to be rotatable. Preferably, the second bearing 14*b* be made of a soft magnetic material so as to be utilized as part of a magnetic path. Also preferably, the second bearing 14*b* be formed by an oil-containing sintered bearing made of iron powder, thereby permitting magnetic flux to pass therethrough while reducing shaft friction.

The rotor yoke 15 is comprised of a shaft portion 151 and magnetic pole portions 152. The shaft portion 151 of the rotor yoke 15 is formed to be fitted with the first and second bearings 14*a*, 14*b*, and is preferably made of a soft magnetic material. In that case, it is possible to utilize the shaft portion 151 as part of a magnetic circuit. The magnetic pole portions 152 of the rotor yoke 15 are each formed into a protruding pole having a rectangular parallel piped shape and extending radially outwardly of the center axis of the shaft portion 151.

The magnetic pole portions 152 are each formed along the axial direction and are disposed at equal intervals in the outer peripheral direction of the shaft portion 151.

The number of the magnetic pole portions 152 of the rotor yoke 15 is set to be half the number of magnetic poles of the first imaginary magnet (four in the present embodiment) The magnetic pole portions 152 of the rotor yoke 15 are each formed to have an outer diameter slightly smaller than the inner diameter of the first imaginary magnet.

In the above described construction, the first coil 13*a*, the first magnet 11*a*, and the first bearing 14*a* are fixed to the first stator yoke 12*a*, whereby a first stator unit is configured. By fixing the second coil 13*b*, the second magnet 11*b*, and the second bearing 14*b* to the second stator yoke 12*b*, a second stator unit is configured.

In the stepping motor of this embodiment, a stator of the motor is configured by fixing the first and second stator units concentrically with each other by means of a method, not illustrated, in which a cover or the like is used.

In the following, a positional relation between the first and second magnets 11*a*, 11*b* will be explained with reference to FIG. 3.

As described above, the first magnet 11*a* is formed into a semi-cylindrical shape by dividing a cylindrical imaginary magnet into two pieces along the axial direction, the imaginary magnet having an inner peripheral surface thereof divided into n pieces (eight pieces in this embodiment), which are alternately magnetized into S poles and N poles. The first magnet 11*a* is formed so as to be disposed within a column having a fan-shaped bottom surface whose center angle is 180 degrees around the center axis of the rotor yoke 15.

As described above, the second magnet 11*b* has the same shape as the first magnet 11*a*. The second magnet 11*b* is circumferentially magnetized with the same pitch and the same strength as those for the first magnet 11*a*, and is disposed to have a predetermined phase difference relative to the first magnet 11*a* as shown in FIG. 3.

In this embodiment, a gap is provided between the first and second magnets 11*a*, 11*b* as shown in FIG. 3, so that first and second magnetic circuits, described below, do not interfere with each other. Basically, the predetermined phase difference between the first and second magnets 11*a*, 11*b* is one fourth of the magnetizing pitch (i.e., 90 degrees in term of electrical angle and shown by (¼) P in FIG. 3). It should be noted that the predetermined phase difference is sometimes deviated by several percentages from the just-mentioned electrical angle so as to reduce the interference between the first and second magnetic circuits.

An inner peripheral portion of each of the first and second magnets 11*a*, 11*b* has a length that is not necessarily equal to a multiple number of the magnetizing pitch. In each of the first and second magnets 11*a*, 11*b*, one or both of the magnetic poles at opposite ends may be smaller than the other magnetic pole portions. In this embodiment, the magnetic pole portion 11*a*4 of the first magnet 11*a* is formed to be smaller than the other magnetic pole portions 11*a*1 to 11*a*3. Similarly, the magnetic pole portion 11*b*4 is made smaller than the other magnetic pole portions 11*b*1 to 11*b*3.

The magnetic pole portion 12*a*1 of the first stator yoke 12*a* is made to have substantially the same center angle as that of the first magnet 11*a*. Similarly, the magnetic pole portion 12*b*1 of the second stator yoke 12*b* is made substantially the same center angle of that of the second magnet 11*b*.

In the stepping motor according to this embodiment, a rotor of the motor is configured by rotatably supporting the shaft portion 151 of the rotor yoke 15 by the first and second bearings 14*a*, 14*b*. At that time, the magnetic pole portions 152 of the rotor yoke 15 are disposed to face magnetized surfaces of the first and second magnets 11a, 11b.

In the stepping motor according to this embodiment, a first magnetic circuit is formed by the first magnet 11a, the first coil 13a, the first stator yoke 12a, the first bearing 14a, and the rotor yoke 15. A second magnetic circuit is formed by the second magnet 11b, the second coil 13b, the second stator yoke 12b, the second bearing 14b, and the rotor yoke 15.

Next, with reference to FIGS. 4 to 9, an explanation will be given of the principle of drivingly rotating the rotor relative to the stator of the stepping motor of this embodiment that has the above described construction.

Figure 4:
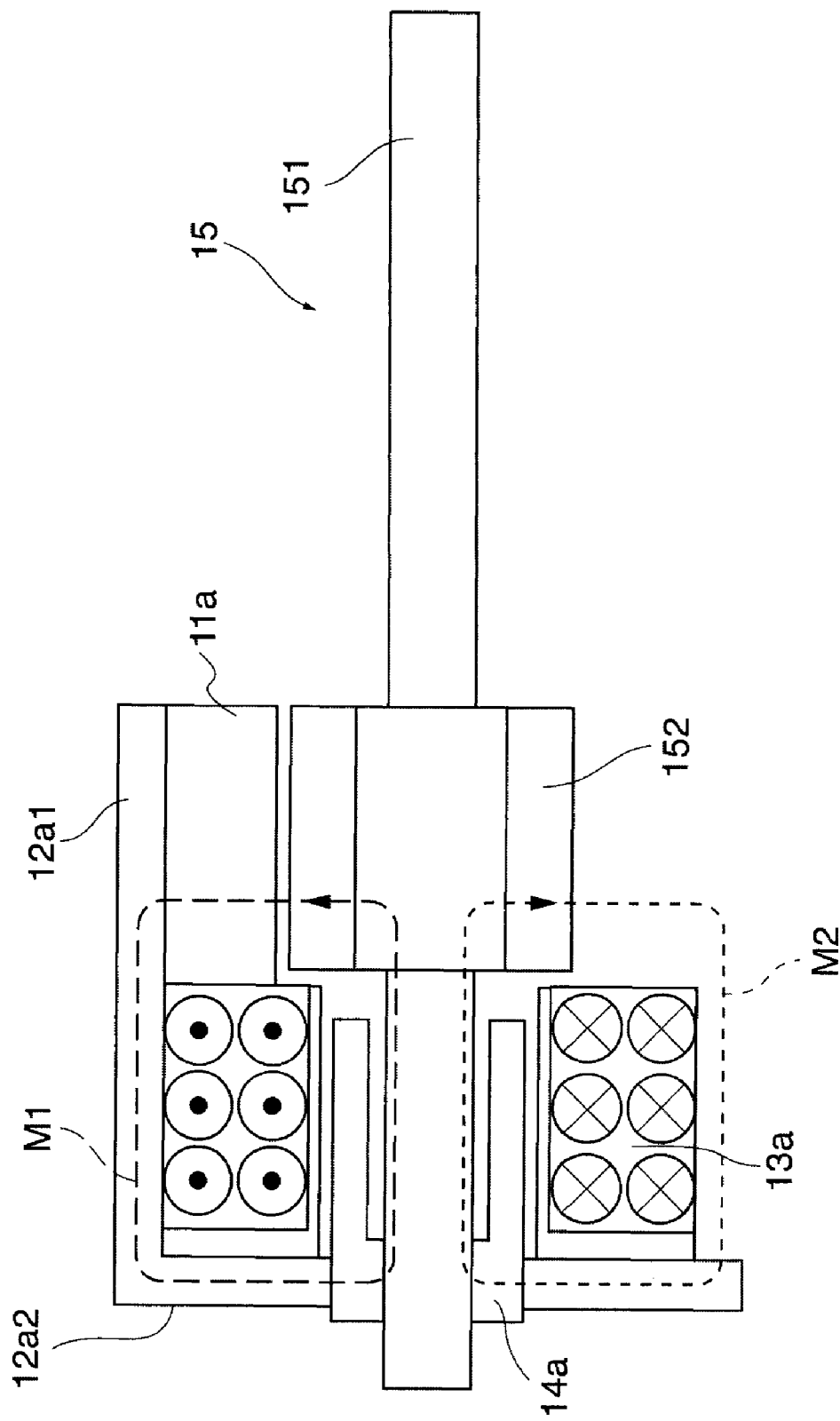
FIG. 4 is a view showing magnetic circuits of the stepping motor.
Figure 5:
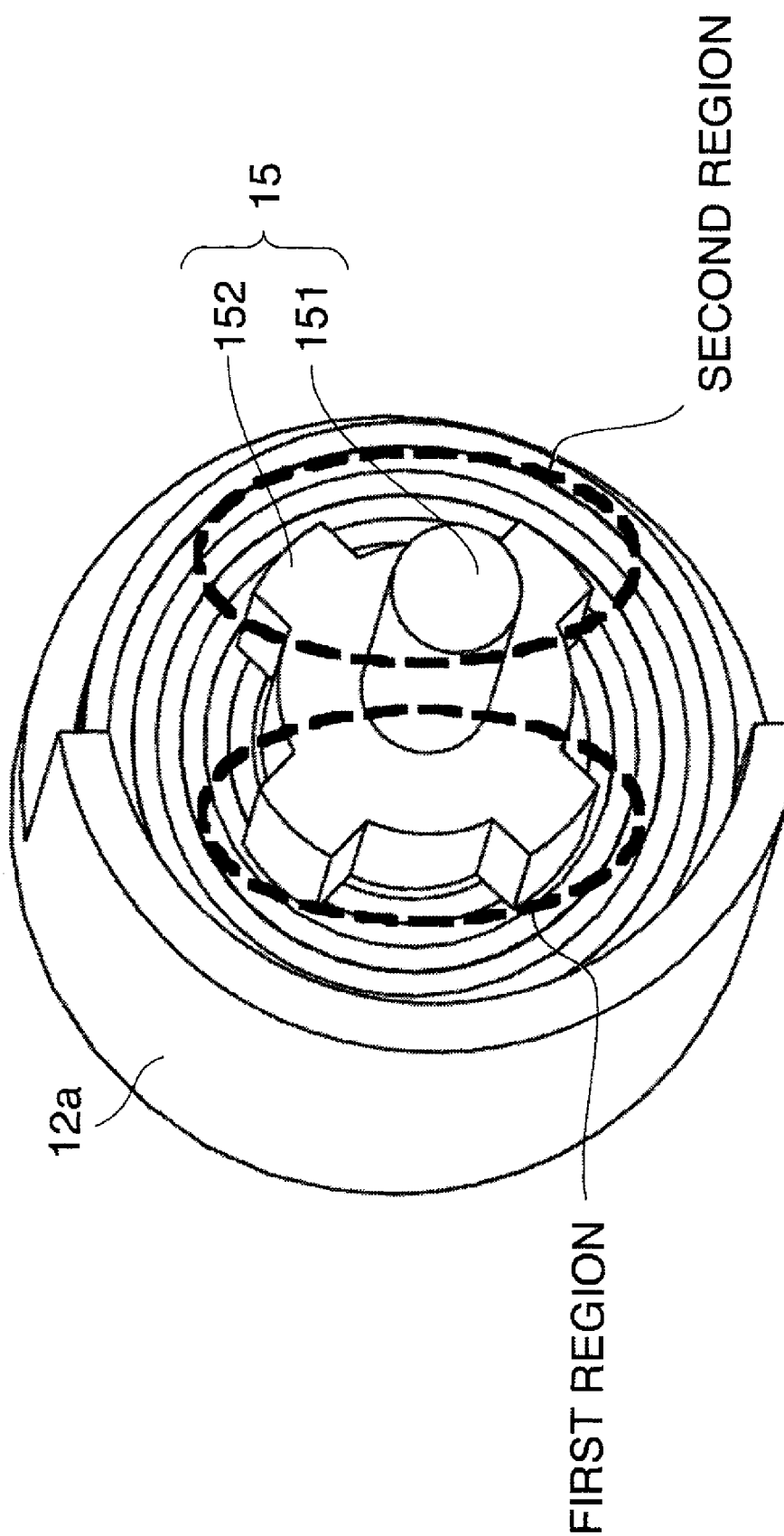
FIG. 5 is a view showing energized regions in a rotor yoke of the stepping motor.

FIG. 4 is a view showing magnetic circuits of the stepping motor, and FIG. 5 is a view showing energized regions of the rotor yoke 15 of the stepping motor.

FIG. 4 shows in cross section the first magnet 11a, the first coil 13a, the first stator yoke 12a, the first bearing 14a, and the rotor yoke 15, which cooperate to form the first magnetic circuit. FIG. 5 shows a first energized region of the rotor yoke 15 which is adapted to be energized by the first coil 13a and a second energized region thereof adapted to be energized by the second coil 13b.

When electric power is supplied in a reverse direction to the first coil 13a for energization, two magnetic paths M1, M2 appear as shown in FIG. 4. The magnetic path M1 passes through a loop consisting of the first magnet 11a, the magnetic pole portion 12a1 and the top panel portion 12a2 of the first stator yoke 12a, the first bearing 14a, the shaft portion and the magnetic pole portions 152 of the rotor yoke 15, and components made of a soft magnetic material. On the other hand, the magnetic path M2 includes an air gap having a large magnetic resistance.

Accordingly, most of a magnetic flux generated by the first coil 13a passes through the magnetic path M1. As a result, only those parts of the magnetic pole portions 152 of the rotor yoke 15 through which the magnetic path M1 can pass are strongly energized. Specifically, the magnetic pole portions 152 (facing the first stator yoke 12a) of the rotor yoke 15 disposed within the first region shown in FIG. 5 can be energized. In contrast, those parts of the magnetic pole portions disposed in the second region are not energized. The first and second regions are immovable relative to the first and second stator yokes 12a, 12b.

A second magnetic circuit is formed by the second magnet 11b, the second coil 13b, the second stator yoke 12b, the second bearing 14b, and the rotor yoke 15. The magnetic pole portions 152 of the rotor yoke 15 within the second region shown in FIG. 5 are made to face the magnetized portions of the second magnet 11b. As a result, parts of the magnetic pole portions 152 of the rotor yoke 15 (which face the second stator yoke 12b) within the second region can be energized by the second coil 13b.

FIGS. 6 to 9 are views showing angular positional relations between the rotor yoke 15 and the first and second magnets 11a, 11b in different energization states.

Figure 6:
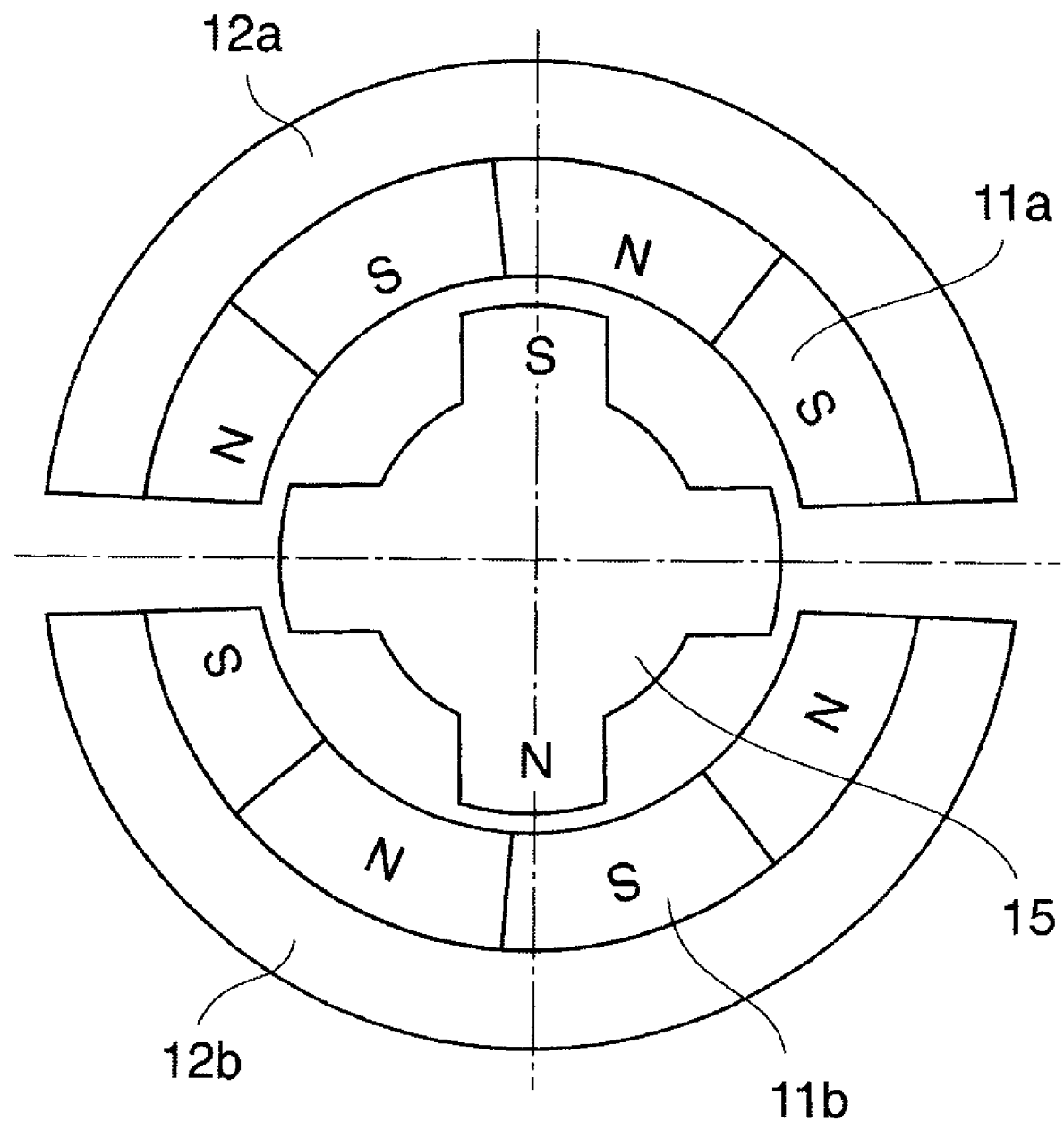
FIG. 6 is a view showing an angular positional relation between a rotor yoke and first and second magnets observed when a first coil is inversely energized and a second coil is forwardly energized.

FIG. 6 shows a state where the first coil 13a (FIG. 2) is inversely energized and the second coil 13b (FIG. 2) is forwardly energized. By energizing the first coil 13a, part of the magnetic pole portions 152 of the rotor yoke 15 which is within the first region is magnetized into an S pole. By energizing the second coil 13b, part of the magnetic pole portions 152 of the rotor yoke 15 which is within the second region is magnetized into an N pole. At that time, the rotor yoke 15 is made stable at an angular position shown in FIG. 6 due to a magnetic balance between the magnetic pole portions 152 of the energized rotor yoke 15 and the first and second magnets 11a, 11b.

Figure 7:
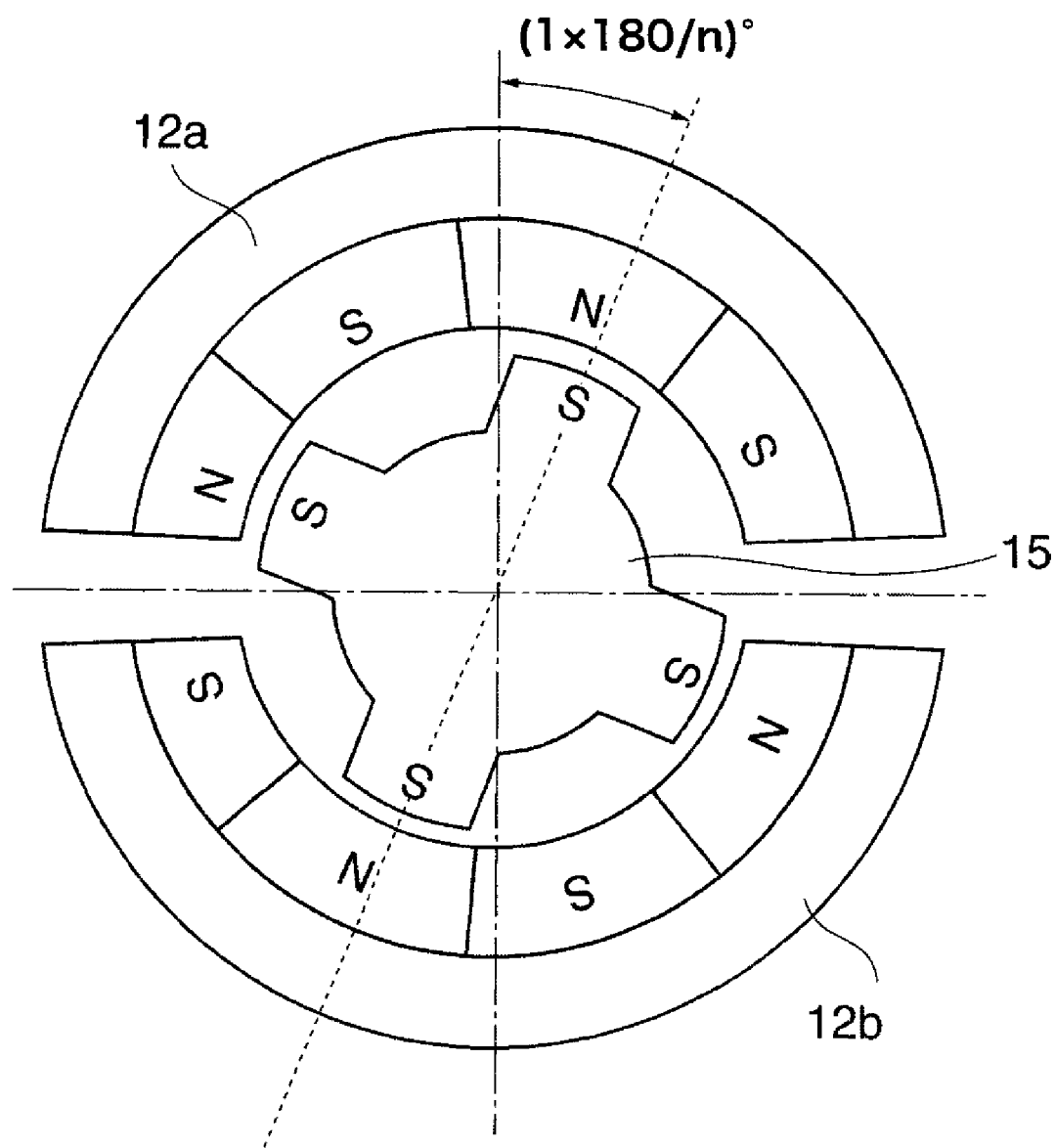
FIG. 7 is a view showing an angular positional relation between the rotor yoke and the first and second magnets observed when the first and second coils are reversely energized.

FIG. 7 shows a state where both the first and second coils 13a, 13b are inversely energized. Those parts of the magnetic pole portions 152 of the rotor yoke 15 which are within the first region are magnetized into S poles, and those parts thereof which are within the second region are magnetized into S poles. As a result, the rotor yoke 15 is made stable at an angular position shown in FIG. 7 which is rotated from the state shown in FIG. 6 by an angle of 180/n degrees (22.5 degrees in this embodiment).

Figure 8:
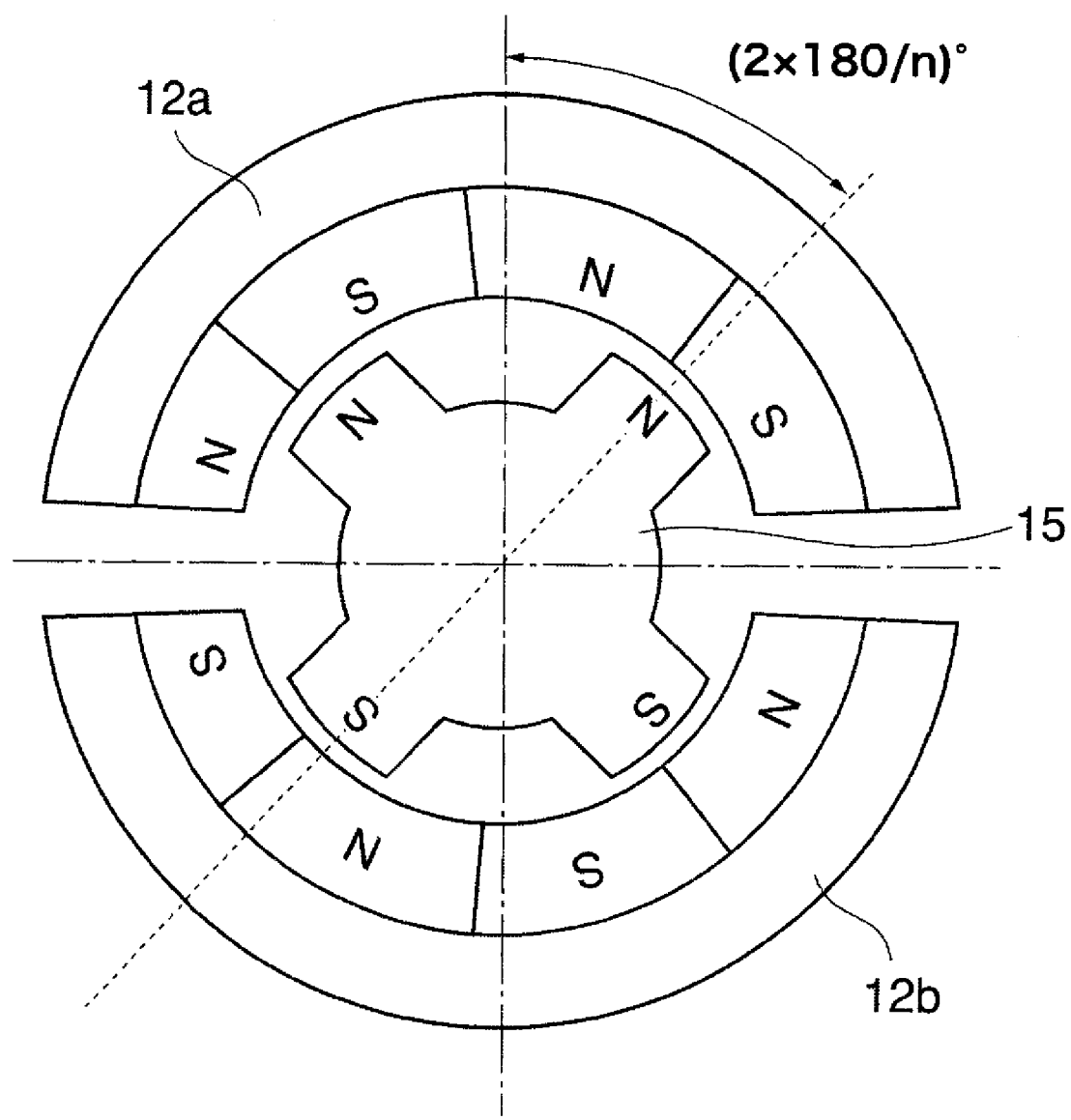
FIG. 8 is a view showing an angular positional relation between the rotor yoke and the first and second magnets observed when the first coil is forwardly energized and the second coil is reversely energized.

FIG. 8 shows a state where the first coil 13a is forwardly energized and the second coil 13b is inversely energized. Those parts of the magnetic pole portions 152 of the rotor yoke 15 which are within the first region are magnetized into N poles, and parts thereof which are within the second region are magnetized into S poles. As a result, the rotor yoke 15 is made stable at an angular position shown in FIG. 8 to which the rotor yoke 15 is rotated from the state in FIG. 6 by an angle of 2×180/n degrees (45 degrees in this embodiment).

Figure 9:
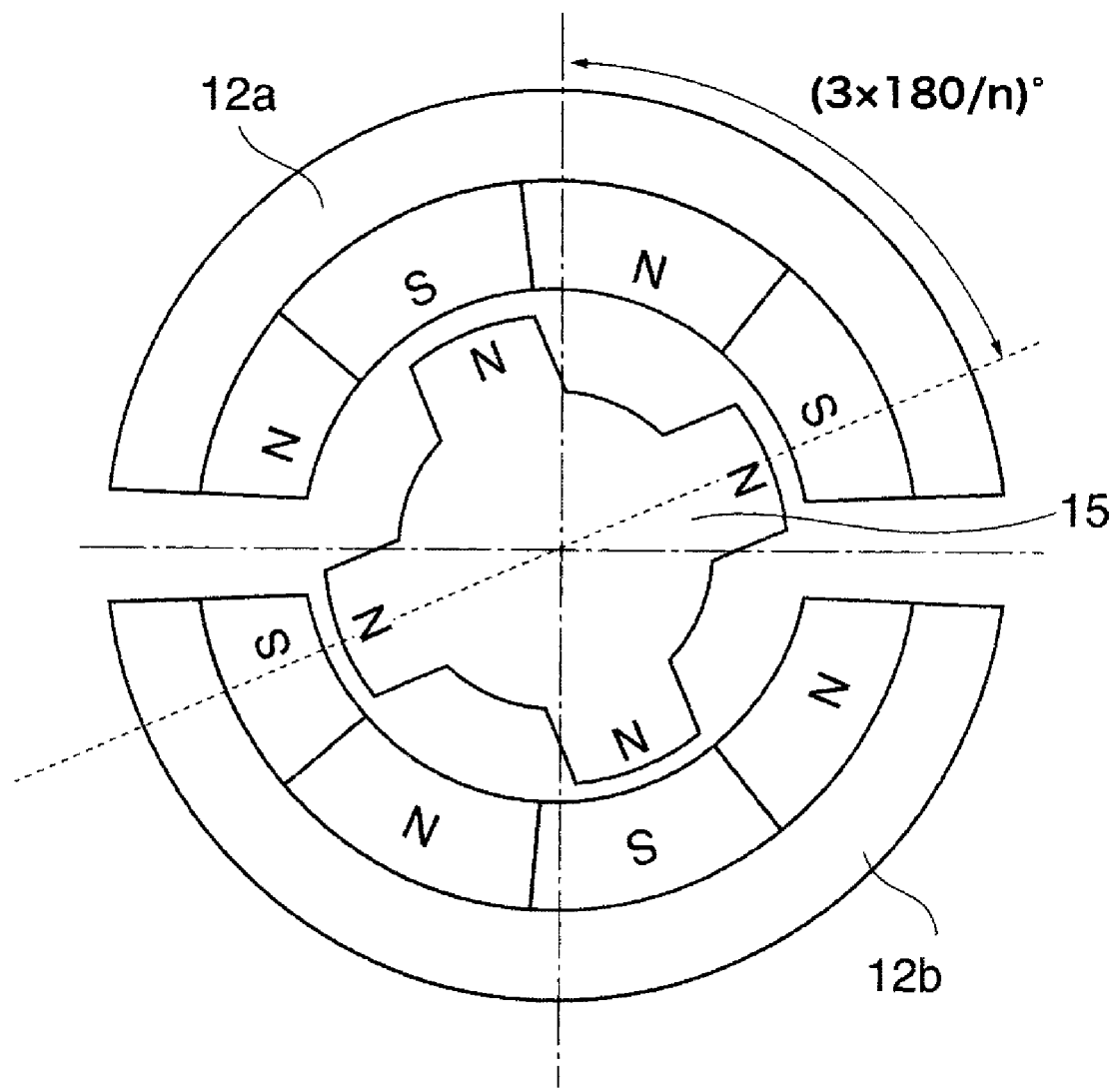
FIG. 9 is a view showing an angular positional relation between the rotor yoke and the first and second magnets observed when the first and second coils are forwardly energized.

FIG. 9 is a state where both the first and second coils 13a, 13b are forwardly energized. Those parts of the magnetic pole portions 152 of the rotor yoke 15 which are within the first region are magnetized into N poles, and those parts thereof which are within the second region are magnetized into N poles. As a result, the rotor yoke 15 is made stable at an angular position shown in FIG. 9 to which the rotor yoke 15 is rotated by 3×180/n degrees (67.5 degrees in this embodiment) from the state shown in FIG. 6.

Next, the first coil 13a is reversely energized and the second coil is forwardly energized again. By this energization, that part of the magnetic pole portions 152 of the rotor yoke 15 which is within the first region is magnetized into an S pole, whereas that part thereof which is within the second region is energized into an N pole. As a result, the rotor yoke become stabilized at an angular position to which the rotor yoke is rotated by an angle of 4×180/n degrees (90 degrees in this embodiment) from the state shown in FIG. 6. At that time, the angular positional relation between the rotor yoke 15 and the first and second magnets 11a, 11b is the same as that shown in FIG. 6 and therefore, an illustration is omitted herein.

As described above, the stable position of the rotor yoke 15 in the rotational direction can be shifted by sequentially switching the directions of energization of the first and second coils 13a, 13b. As a result, it is possible to cause the rotor yoke 15 to rotate relative to the first and second magnets 11a, 11b.

Next, an explanation will be given of functions and effects of the stepping motor of this embodiment.

With the stepping motor according to this embodiment, those parts of the first magnetic circuit through which magnetic flux generated by the energization of the first coil 13a passes and those parts of the second magnetic circuit through which magnetic flux generated by the energization of the second coil 13b passes can be disposed in a juxtaposed relation in the circumferential direction. As compared to the prior art stepping motors disclosed in Japanese Laid-open Patent Publications Nos. 09-331666, 2002-51526, and 2005-204453 in which the first and second magnetic circuits are juxtaposed in the axial direction, therefore, it is possible to realize a reduction in axial length of the stepping motor. The details will be described in the following.

The first and second magnetic circuits must be disposed so as to provide some gap therebetween. In the case of the first and second magnetic circuits being disposed to be excessively close to each other, a magnetic flux generated by the first coil flows into the second magnetic circuit or conversely a magnetic flux generated by the second coil flows into the first magnetic circuit, resulting in a deteriorated accuracy of rotation of the stepping motor and an increased cogging torque.

In the following, a comparison is made between the stepping motor of this embodiment and the prior art stepping motor in respect of an area over which the magnet and the magnetic pole portions energized by the first magnetic circuit face each other under the assumption that these motor are the same in magnet length. The axial length of the stepping motor of this embodiment is represented by the magnet length, whereas the axial length of the prior art stepping motor is represented by half a value that is obtained by subtracting an air gap distance from the magnet length. Thus, the axial length of the stepping motor of this embodiment is more than twice greater than that of the prior art stepping motor. The circumferential length of the stepping motor of this embodiment is represented by half a value that is obtained by subtracting an air gap distance from 360 in term of degree, whereas the circumferential length of the prior art stepping motor is represented by 360 degrees. Thus, the circumferential length of the prior art stepping motor is more than twice greater than that of the stepping motor of this embodiment.

Accordingly, the area over which the magnet faces the magnetic pole portions energized by the first magnetic circuit is equal between the stepping motor of this embodiment and the prior art stepping motor, under the assumption that the magnet length is equal therebetween.

Next, there will be considered a case where the magnet length is made shortened in the stepping motor of this embodiment and the prior art stepping motor. Even in such a case, the air gap distance must be equal to or larger than that seen before the magnet length is shortened. In other words, with the prior art stepping motor, the area over which the magnet faces the magnetic pole portions energized by the first magnetic circuit decreases at a rate equal to or greater than the rate of the magnet length being shortened, resulting in a reduced torque.

In contrast, according to the stepping motor of this embodiment, the area over which the magnet faces the magnet pole portions energized by the first magnetic circuit decreases at the rate that is the same as the rate of the magnet length being shortened. This indicates that the stepping motor of this embodiment is higher in efficiency than the prior art stepping motor.

By way of example, it is assumed here that the original magnet length is represented by 10, and the required air gap distance is represented by 1, and the circumferential length is represented by 10. In that case, the area over which the magnet faces the magnetic pole portions energized by the first magnetic circuit is represented by $(10-1)/2 \times 10 = 45$ in both the stepping motor of this embodiment and the prior art stepping motor. If the magnet length is reduced by 20% from this arrangement, then the area over which the magnet faces the magnetic pole portions energized by the first magnetic circuit is represented by $(8-1)/2 \times 10 = 35$ in the prior art stepping motor.

On the other hand, in the stepping motor of this embodiment, the area over which the magnet faces the magnetic pole portions energized by the first magnetic circuit is represented by $8 \times (10-1) = 36$. In this manner, the stepping motor of this embodiment is advantageous than the prior art stepping motor.

Next, a case will be considered in which the motor diameter is increased and the magnet length is kept unchanged in the stepping motor of this embodiment and the prior art stepping motor. In such a case, the area over which the magnet faces the magnetic pole portions energized by the first magnetic circuit increases by 20% in the prior art stepping motor.

On the other hand, in the stepping motor of this embodiment, the area over which the magnet faces the magnetic pole portions energized by the first magnetic circuit increases by more than 20%. The stepping motor of this embodiment is higher in efficiency than the prior art stepping motor. This is because an angle occupied by the gap between the two magnetic circuits can be decreased by increasing the motor diameter, provided that the magnetic flux is nearly the same so that the gap may be the same before and after the motor diameter being increased.

By way example, if the diameter of the prior art stepping motor is increased by 20%, then the area over which the magnet faces the magnetic pole portions energized by the first magnetic circuit is represented by $(10-1) \times 12/2 = 54$.

On the other hand, in the stepping motor of this embodiment, the area over which the magnet faces the magnetic pole portions energized by the first magnetic circuit is represented by $10 \times (12-1)/2 = 55$. This indicates that the stepping motor of this embodiment is more advantageous than the prior art stepping motor.

As described above, it is considered that the stepping motor of this embodiment is advantageous in having the shortened axial length and the improved efficiency.

Next, an explanation will be given of the number of magnetized poles of the magnet of the stepping motor. In this embodiment, in order to prevent magnetic interference from occurring between the first and second magnetic circuits, an air gap (non-magnetized portion) is provided in each of the first and second magnets 11a, 11b in the circumference direction. The magnetic pole portions 152 of the rotor yoke 15 facing the air gaps in the first and second magnets 11a, 11b are not energized even if electric power is supplied to the coils, and hence do not contribute to the generation of torque.

Thus, the number of magnetic poles of the rotor yoke 15 which are magnetized varies between an angular position (for instance, the state shown in FIG. 6) in which the air gaps in the first and second magnets 11a, 11b face the magnetic pole portions 152 of the rotor yoke 15 and another angular position in which the air gaps do not face the magnetic pole portions. As a result, there is a fear that the stepping motor can generate uneven torque. This is especially noticeable when the magnetic poles of the rotor yoke are small in number.

However, the number of magnetic poles of the rotor yoke which are not magnetized cannot exceed the number of the air gaps formed in the magnet. In the case that the number of magnetic poles of the rotor yoke is large, there is a reduction in the proportion of the magnetic poles which are not magnetized, thus relaxing the problem of uneven torque. Thus, the stepping motor of this embodiment is particularly advantageous in the case where the rotor yoke is provided with a large number of the magnetic poles, i.e., the magnetized magnetic poles of the magnet are large in number.

Next, an explanation will be given of advantages of the first and second magnets 11a, 11b each formed into a semi cylindrical shape. In order to magnetize the inner peripheral surface of a cylindrical magnet, a magnetizing yoke and a magnetizing coil must be disposed on the inner peripheral side of the magnet. However, there is a limit in a size reduction of the magnetizing yoke and the magnetizing coil, and thus it is much difficult to dispose the magnetizing yoke and the magnetizing coil on the inner peripheral side of the magnet with the advancement of magnet size reduction. Thus, it is impossible to perform the inner peripheral magnetization of a magnet having a diameter thereof smaller than a prescribed diameter.

In contrast, according to the present embodiment where the magnet is divided into the first and second magnets (two piece arrangement), the first and second magnets 11a, 11 can each be formed into a semi-cylindrical shape. As a result, it is possible to dispose the magnetizing yoke and the magnetizing coil on the open side (i.e., the inner peripheral surface side) of the first and second magnets 11a, 11b. In other words, it is possible to form the first and second magnets 11a, 11b to have a small diameter which cannot be realized in a cylindrical magnet in view of the difficulty of effecting magnetization.

As explained in the above, the present embodiment makes it possible to dispose parts of the first and second magnetic circuits of the stepping motor in a juxtaposed relation to each other in the circumferential direction. Thus, it is possible to realize a stepping motor whose axial dimension is shortened than the prior art examples where the first and second magnetic circuits are juxtaposed in the axial direction.

Second Embodiment

Figure 10:
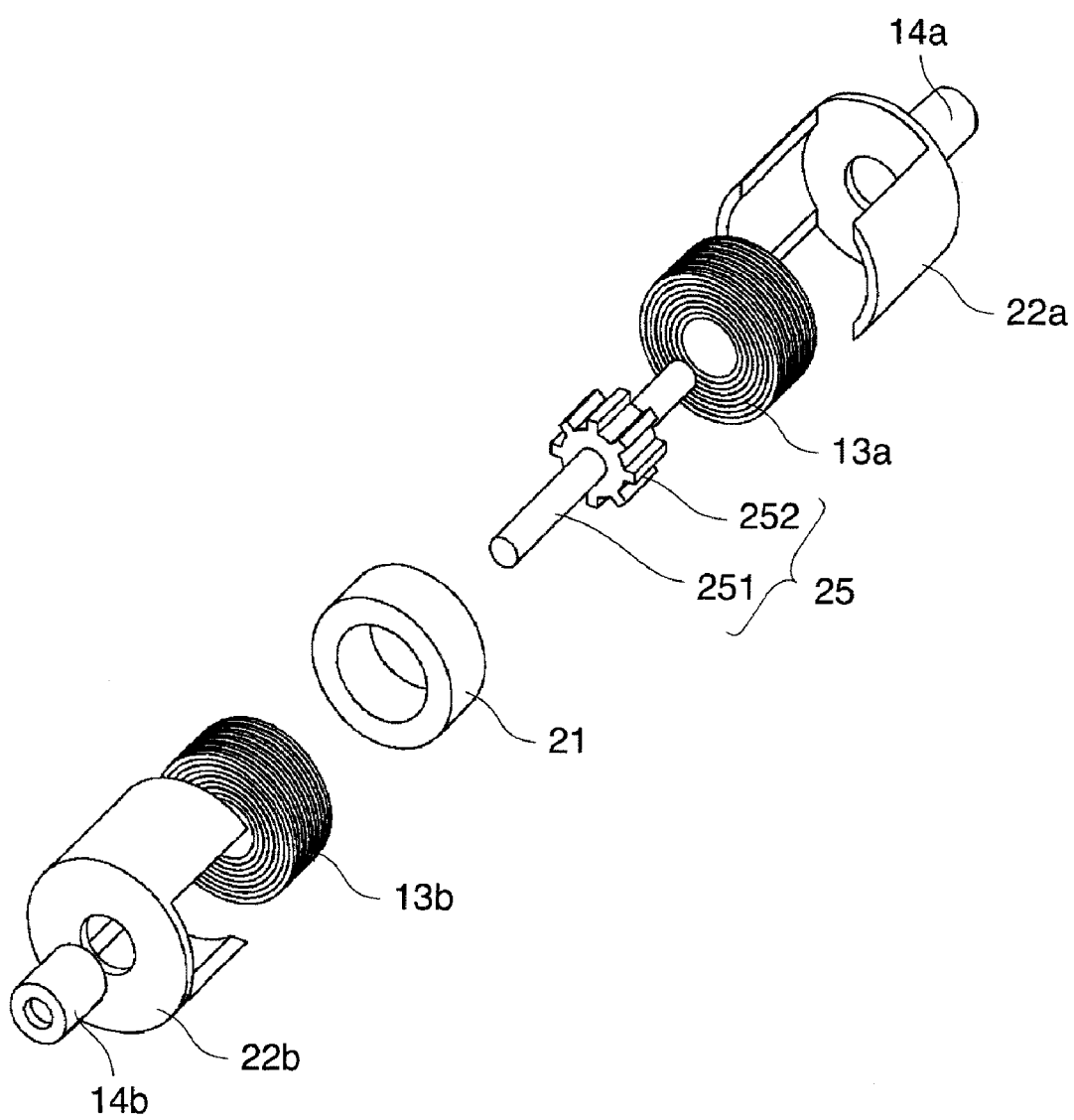
FIG. 10 is an exploded perspective view showing components of a stepping motor as a drive apparatus according to a second embodiment of the present invention.
Figure 11:
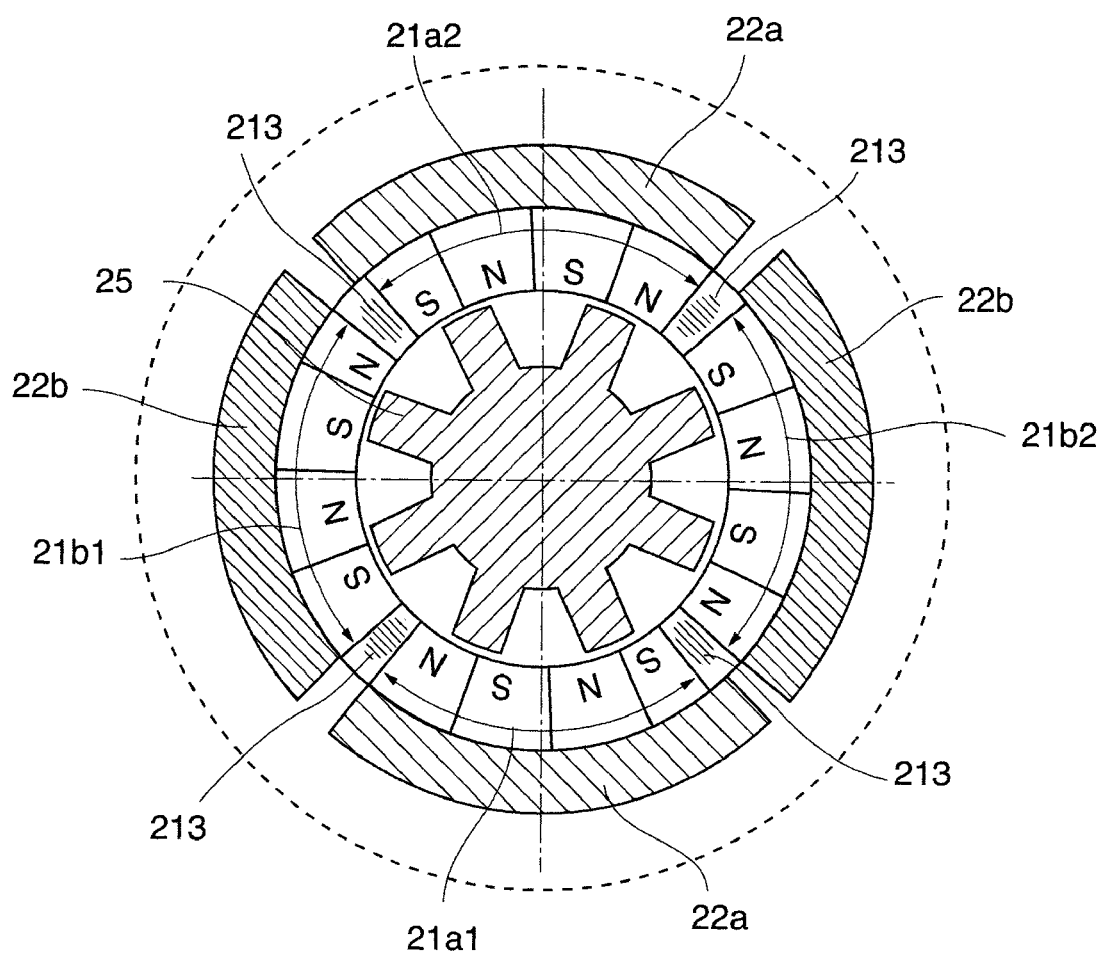
FIG. 11 is a sectional view showing the stepping motor taken along a plane perpendicular to a center axis of the stepping motor which is in an assembled state.

FIG. 10 is an exploded perspective view showing components of a stepping motor as a drive apparatus according to a second embodiment of this invention, and FIG. 11 is a sectional view showing the stepping motor in cross section perpendicular to the center axis of the motor which is in an assembled state.

Referring to FIGS. 10 and 11, the stepping motor includes a magnet 21, a first stator yoke 22a, and a second stator yoke 22b. The stepping motor further includes a first coil 13a, a second coil 13b, a first bearing 14a, a second bearing 14b, and a rotor yoke 25.

The magnet 21 is formed into a cylindrical shape, and has an inner peripheral portion thereof formed with two first magnetized pattern portions 21a1, 21a2 and two second magnetized pattern portions 21b1, 21b2 each extending approximately 90 degrees. The two first magnetizing portions 21a1, 21a2 of the magnet 21 are disposed to face each other with the center axis of the rotor yoke 25 centrally located therebetween. The two second magnetized pattern portions 21b1, 21b2 of the magnet 21 are positioned between the first magnetizing portions 21a1, 21a2 and are disposed to face each other with the center axis of the rotor yoke 25 centrally located therebetween.

The first magnetized pattern portions 21a1, 21a2 are formed by part of a cylindrical image magnet having an inner peripheral surface thereof divided into n pieces (sixteen pieces in this embodiment) which are alternately magnetized into S poles and N poles. The second magnetized pattern portions 21b1, 21b2 are magnetized at the same pitch with the same strength as with the first magnetizing portions 21a1, 21a2. The second magnetizing portions 21b1, 21b2 are disposed to have a phase difference of one fourth of the magnetized pitch (90 degrees in term of electrical angle) relative to the first magnetized pattern portions 21a1, 21a2.

Between the first magnetized pattern portions 21a1, 21a2 and the second magnetized pattern portions 21b1, 21b2 of the magnet 21, there are appropriately provided non-magnetized portions 213 in order to prevent interference between magnetic circuits.

In association with the first magnetized pattern portions 21a1, 21a2 being formed at two locations in the magnet 21, the first stator yoke 22a is provided with two magnetic pole portions facing each other through the rotor yoke 25. The first stator yoke 22a is disposed at such a location as to cooperate with the rotor yoke 25 to sandwich therebetween the first magnetized pattern portions 21a1, 21a2 of the magnet 21.

The second stator yoke 22b is formed into the same shape as with the first stator yoke 22a. Specifically, in association with the second magnetized pattern portions 21b1, 21b2 being formed at two locations in the magnet 21, the second stator yoke 22b is provided at two locations with magnetic pole portions facing each other through the rotor yoke 25. The second stator yoke 22b is disposed such a location as to cooperate with the rotor yoke 25 to sandwich the second magnetized pattern portions 21b1, 21b2 of the magnet 21.

The rotor yoke 25 is comprised of a shaft portion 251 and magnetic pole portions 252. The shaft portion 251 of the rotor yoke 25 is adapted to be fitted into the first and second bearings 14a, 14b. The magnetic pole portions 252 of the rotor yoke 25 are each formed into a protruding pole having a rectangular parallel piped shape and extending radially outwardly of the center axis of the shaft portion 251. The magnetic pole portions 252 are each formed along the axial direction and are disposed at equal intervals in the outer peripheral direction of the rotor yoke 25. The number of the magnetic pole portions 152 of the rotor yoke 25 is set to be equal to eight in this embodiment.

The first coil 13a, the second coil 13b, the first bearing 14a, and the second bearing 14b are the same as those in the above described first embodiment, and therefore, an explanation thereof will be omitted.

In this embodiment, a stator of the stepping motor is formed by fixing the magnet 21, the first stator yoke 22a, the first coil 13a, the first bearing 14a, the second stator yoke 22b, the second coil 13b, and the second bearing 14b concentrically with one another.

In this embodiment, a rotor of the stepping motor is formed by rotatably supporting the shaft portion 251 of the rotor yoke 25 by means of the first and second bearings 14a, 14b.

In the stepping motor of this embodiment, a first magnetic circuit is formed by part of the magnet 21 which includes the first magnetized pattern portion, the first coil 13a, the first stator yoke 22a, the first bearing 14a, and the rotor yoke 25. A second magnetic circuit is formed by part of the magnet 21 which includes the second magnetized pattern portion, the second coil 13b, the second stator yoke 22b, the second bearing 14b, and the rotor yoke 25.

Next, an explanation will be given of functions and effects of the stepping motor according to this embodiment.

In the above described first embodiment, the first and second magnets 11a, 11b are each formed with a single magnetized pattern portion. As a result, a force generated in the rotor yoke 15 when electric power is supplied to the first coil 13a acts on one part of the rotor yoke 15. For this reason, force balance is inadequate, resulting in an increased friction and undesired vibration of the rotor yoke 15. Such a problem is especially noticeable in the case of one-phase driving (in which the drive is performed by supplying electric power to only one coil).

In contrast, in this embodiment, the first magnetized pattern portions are provided at two parts of the magnet 21 and the second magnetized pattern portions are provided at two parts of the magnet 21. In addition, the two first magnetized pattern portions and the two second magnetized pattern portions are uniformly disposed around the center axis of the rotor yoke 25. As a consequence, forces generated when electric power is supplied to the first coil 13a acts as a force couple onto the rotor yoke 25. Thus, a smooth rotation can be performed, without a superfluous load being applied to the center axis of the rotor yoke 25.

It should be noted that the first magnetized pattern portions may be provided at more than two parts of the magnet 21 and the second magnetized pattern portions may be provided at more than two parts of the magnet 21. However, in the case that the magnetized pattern portions are provided at more than two parts, the number of the non-magnetized portions 213 increases that do not contribute to the generation of rotary torque. Therefore, in order to minimize the number of the non-magnetized portions while generating a force couple, it is preferable that the two first magnetized pattern portions and the two second magnetized pattern portions be provided in the magnet 21.

Next, an explanation will be given of effects that can be attained by the magnet 21 that is formed integrally into one piece. If a phase difference between the first and second magnetic circuits is even slightly deviated from a predetermined angle, the performance of the stepping motor is remarkably deteriorated due to the increase in cogging torque, for example.

In this embodiment, since the magnet 21 has a one-piece structure (a single cylindrical shape), the phase difference between the first and second magnetic circuits can be determined only by the magnetized pattern portions of the magnet 21. Thus, the stepping motor which is excellent in quality can be realized without regard to the presence or absence of motor assembly errors.

As described above, according to this embodiment, it is possible to dispose part of the first magnetic circuit and part of the second magnetic circuit so as to be juxtaposed to each other in the circumferential direction of the stepping motor, making it possible to reduce the axial dimension of the stepping motor as compared to a prior art stepping motor including the first and second magnetic circuits juxtaposed to each other in the axial direction of the motor.

Third Embodiment

Figure 12:
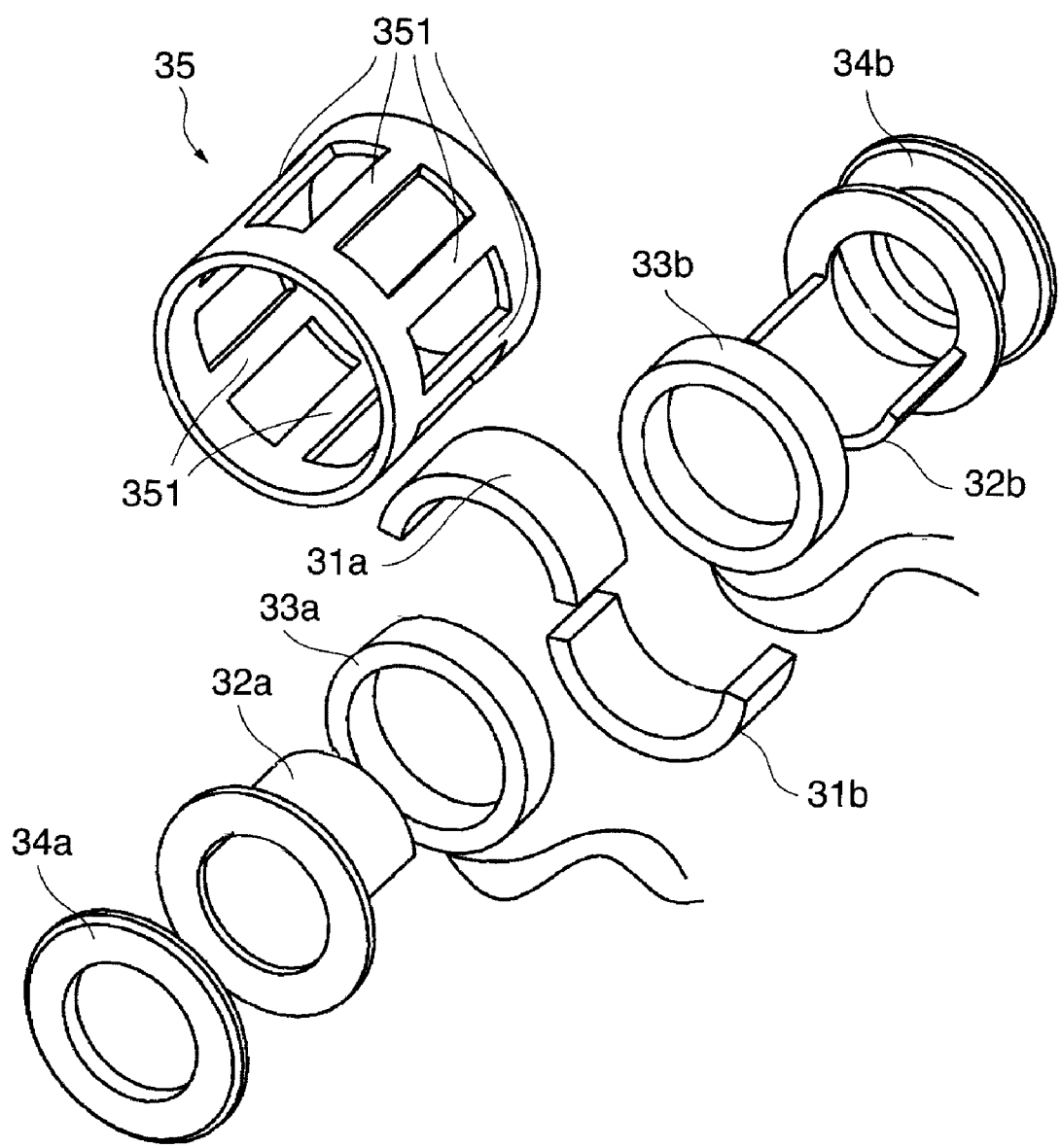
FIG. 12 is an exploded perspective view showing components of a stepping motor as a drive apparatus according to a third embodiment of the present invention.
Figure 13:
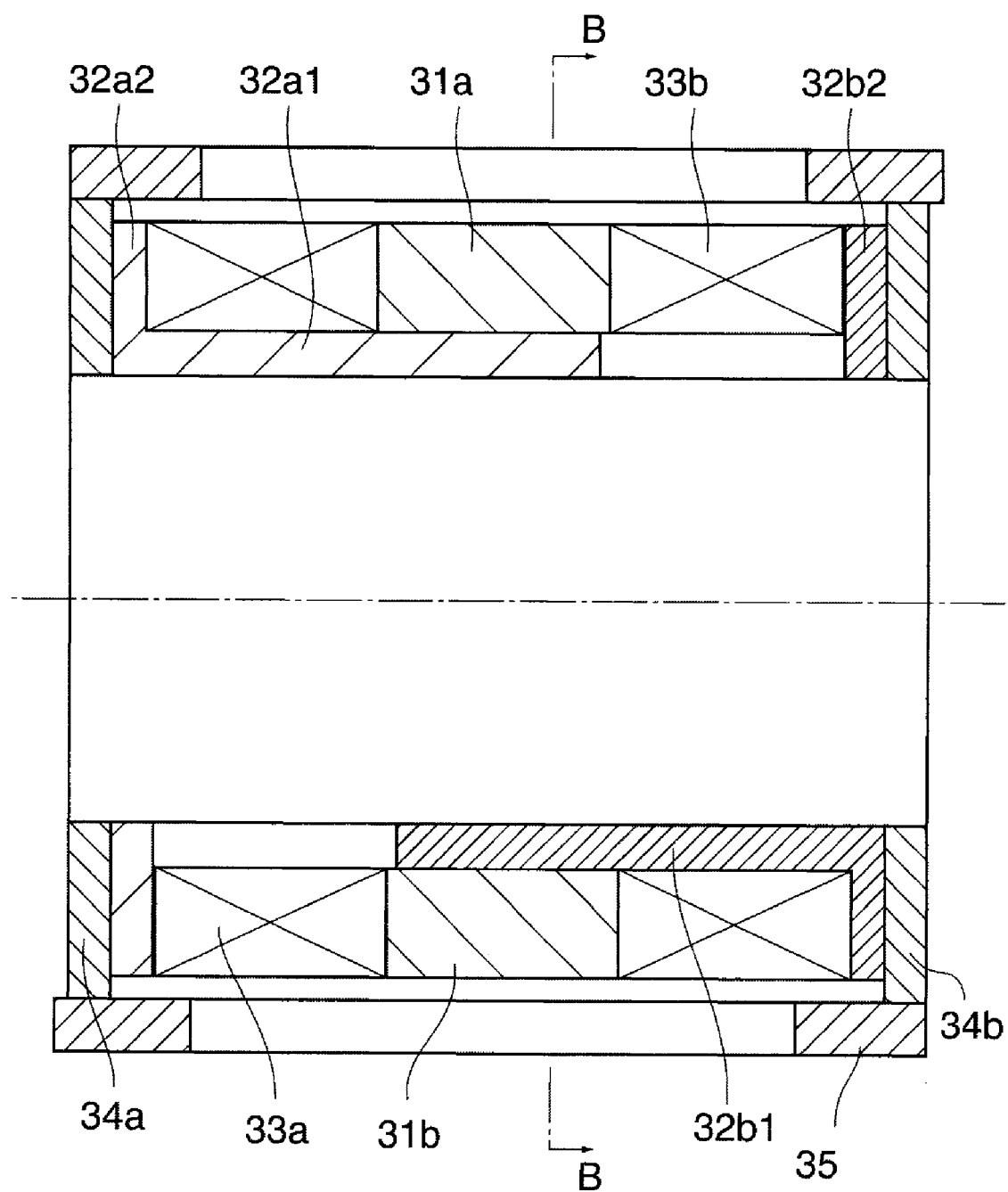
FIG. 13 is a sectional view showing the axial construction of the stepping motor which is in an assembled state.
Figure 14:
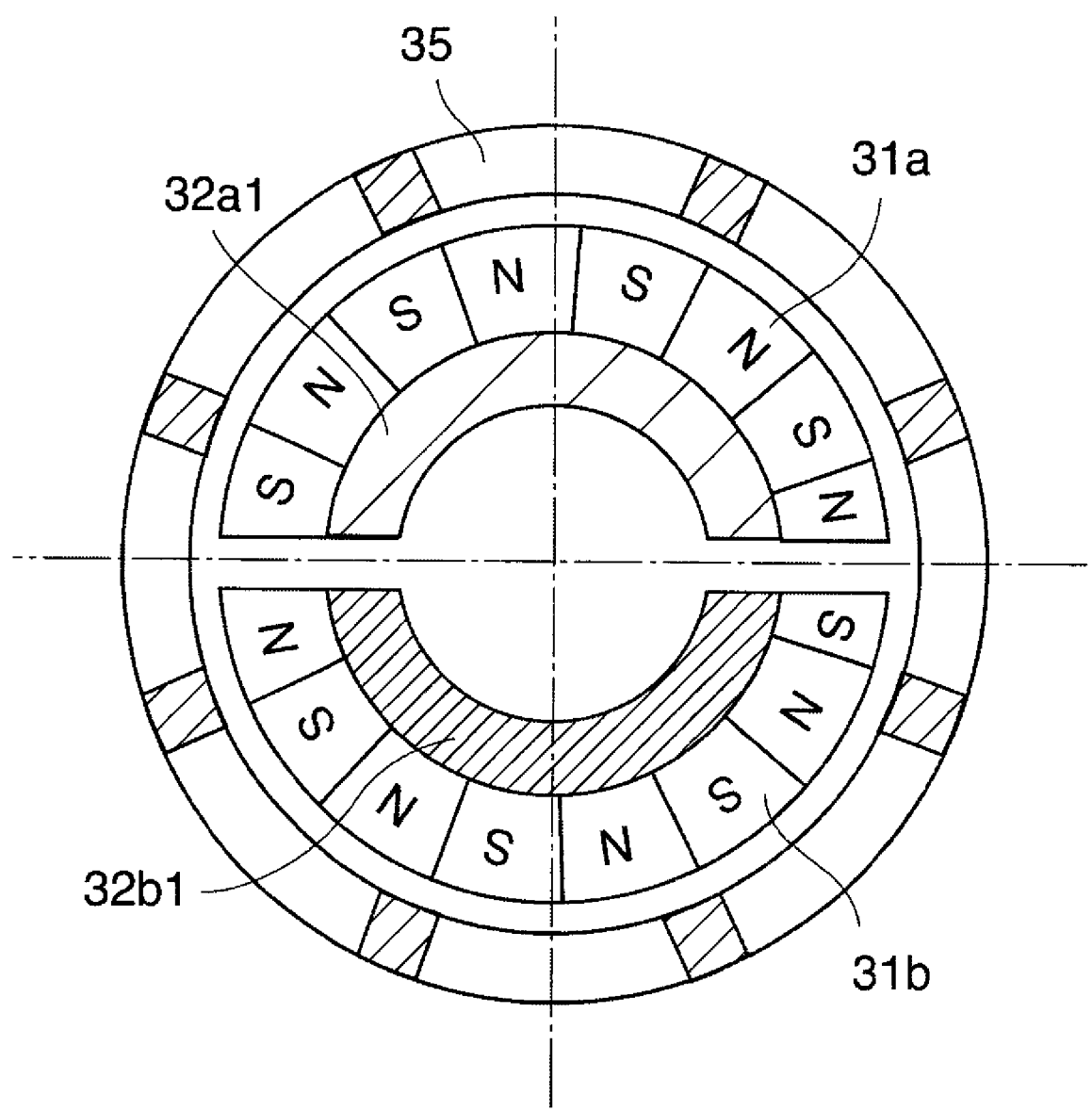
FIG. 14 is a sectional view taken along line B-B in FIG. 13 and showing the construction of the stepping motor.

FIG. 12 is an exploded perspective view showing components of a stepping motor as a drive apparatus according to a third embodiment of the present invention, FIG. 13 is a sectional view showing the axial construction of the stepping motor which is in an assembled state, and FIG. 14 is a sectional view taken along line B-B in FIG. 13 and showing the construction of the stepping motor.

Referring to FIGS. 12 to 14, the stepping motor includes a first magnet 31a, a second magnet 31b, a first stator yoke 32a, and a second stator yoke 32b. The stepping motor further includes a first coil 33a, a second coil 33b, a first bearing 34a, a second bearing 34b, and a rotor yoke 35.

With the constructions of the first and second embodiments, the inner peripheral portion of the magnet is magnetized to thereby rotate the rotor yoke arranged on the inner peripheral side of the magnet.

In contrast, with this embodiment, outer peripheral portions of the first and second magnets 31a, 31b are magnetized, and the rotor yoke 35 arranged on the outer peripheral side of the first and second magnets 31a, 31b are rotated. In this embodiment, the stepping motor is formed into a hollow cylindrical shape having the cylindrical stator yoke 35 that is formed with an axially extending space portion (an opening portion).

The first magnet 31a is formed into a semi-cylindrical shape obtained by dividing a cylindrical imaginary magnet into two pieces along the axial direction, the imaginary magnet having an outer peripheral surface thereof divided into n pieces (sixteen pieces in this embodiment) which are alternately magnetized into S poles and N poles. The first magnet 31a is formed so as to be disposed within a column having a fan-shaped bottom surface whose center angle is 180 degrees around the center axis of the rotor yoke 35.

The second magnet 31b has the same shape as the first magnet 31a. The second magnet 31b has a magnetized pattern portion thereof circumferentially magnetized at the same pitch with the same strength as with the first magnet 31a, the magnetized pattern portion being disposed to have a phase difference relative to the first magnet 31a that is equal to one fourth of the magnetizing pitch (i.e., 90 degrees in term of electrical angle).

In this embodiment, a gap is provided between the first and second magnets 31a, 31b as shown in FIG. 14, so that the below-mentioned first and second magnetic circuits do not interfere with each other.

The first stator yoke 32a is made of a soft magnetic material and formed by a semi-cylindrical magnetic pole portion 32a1 and a circular disk-shaped top panel portion 32a2. The magnetic pole portion 32a1 of the rotor yoke 32a is formed to have an outer diameter thereof nearly equal in dimension to an inner diameter of the first magnet 31a and have an outer diameter arc length thereof nearly equal to an inner diameter arc length of the first magnet 31a. As a result, the first stator yoke 32a can be disposed to cover the inner periphery of the first magnet 31a.

The second stator yoke 32b is formed into the same shape as with the first stator yoke 32a. Specifically, the second stator yoke 32b is made of a soft magnetic material and formed by a semi-cylindrical magnetic pole portion 32b1 and a circular disk-shaped top panel portion 32b2. The magnetic pole portion 32b1 of the second stator yoke 32b is formed to have an outer diameter thereof nearly equal in dimension to an inner diameter of the second magnet 31b and have an outer diameter arc length nearly equal to an inner diameter arc length of the second magnet 31b. As a result, the second stator yoke 32b can be disposed to cover the inner periphery of the second magnet 31b.

The first coil 33a is formed by wounding an electrically conductive wire a large number of times around the center axis of the rotor yoke 35. The shape, the number of times of winding, and the resistance of the second coil 33b are the same as or similar to those of the first coil 33a.

The first bearing 34a is formed into an annular shape and has an outer diameter portion for supporting the rotor yoke 35 for rotation. The second bearing 34b is the same or similar in shape to the first bearing 34a. Specifically, the second bearing 34b is formed into an annular shape and has an outer diameter portion thereof adapted to support the rotor yoke 35 for rotation.

The rotor yoke 35 is made of a soft magnetic material, is formed into a cylindrical shape, and includes a plurality of magnetic pole portions 351. Specifically, the rotor yoke 35 has a circumferential wall portion thereof formed with axially extending slits periodically (at predetermined intervals) in the circumferential direction, and functions as the magnetic pole portions 351. The number of the magnetic pole portions 351 of the rotor yoke 35 is set to be half the number n (eight in this embodiment) of magnetic poles of the above described imaginary magnet.

In the above described construction, the first coil 33a, the first magnet 31a, and the first bearing 34a are fixed to the first stator yoke 32a, whereby a first stator unit is configured. By fixing the second coil 33b, the second magnet 31b, and the second bearing 34b to the second stator yoke 32b, a second stator unit is configured.

In the stepping motor of this embodiment, a stator of the motor is configured by fixing the first and second stator units concentrically with each other by means of a method, not illustrated, in which a cover or the like is used.

In the stepping motor according to this embodiment, a rotor of the motor is configured by rotatably supporting the rotor yoke 35 by the first and second bearings 34a, 34b. At that time, the magnetic pole portions 351 of the rotor yoke 35 are disposed to face magnetized surfaces of the first and second magnets 31a, 31b.

As with the above described first embodiment, a first magnetic circuit through which a magnetic flux generated when electric power is supplied to the first coil 33a passes is formed in this embodiment, the first magnetic circuit being formed by the first magnet 31a, the first stator yoke 32a, the first bearing 34a, and the rotor yoke 35. A second magnetic circuit consisting of the second magnet 31b, the second stator yoke 32b, the second bearing 34b, and the rotor yoke 35 is formed through which passes a magnetic flux generated when electric power is supplied to the second coil 33b.

The magnetic flux passing through the first magnetic circuit energizes part of the rotor yoke 35 which faces the magnetized pattern portion of the first magnet 31a. The magnetic flux passing through the second magnetic circuit energizes part of the rotor yoke 35 which faces the magnetized pattern portion of the second magnet 31b. Thus, the stable position of the rotor yoke 35 in the rotational direction can be shifted by sequentially switching the directions of energization of the first and second coils 33a, 33b. As a result, it is possible to cause the rotor yoke 35 to rotate relative to the first and second magnets 31a, 31b.

Next, an explanation will be given of functions and effects of the stepping motor of this embodiment.

In this embodiment, the stepping motor is formed into a hollow cylindrical shape including a cylindrical stator yoke 35 formed with the axially extending space portion (opening portion) that can be utilized for a lens optical path, fluid flow path, electrical wiring, or the like.

In this embodiment, the first and second magnets 31a, 31b each having a magnetized outer peripheral surface are used. In the case of magnetizing an inner peripheral surface of a magnet in order to magnetize the magnet, a magnetizing yoke and a magnetizing coil must be disposed in the inside of the magnet. For this reason, the inner diameter of the magnet cannot be reduced to a value below which the magnetizing yoke and the magnetizing coil cannot be disposed in the magnet. On the other hand, in the case of magnetizing an outer peripheral surface of a magnet, a magnetizing yoke and a magnetizing coil are disposed on the outside of the magnet. Thus, the magnetizing yoke and the magnetizing coil can be disposed thereon, even if the magnet has a reduced inner diameter.

In the case of magnetizing the outer peripheral surface of a magnet, a thicker magnetizing coil can be used as compared to the case where the inner peripheral surface of the magnet is magnetized. Thus, the construction including a magnet having a magnetized outer peripheral surface can realize a reduction in size and an improvement in efficiency of a stepping motor.

As explained in the above, this embodiment makes it possible to dispose parts of the first and second magnetic circuits of the stepping motor in a juxtaposed relation to each other in the circumferential direction of a stepping motor. Thus, it is possible to realize a stepping motor whose axial dimension is shortened than in the prior art examples where first and second magnetic circuits are juxtaposed in the axial direction of the motor.

Fourth Embodiment

Figure 15:
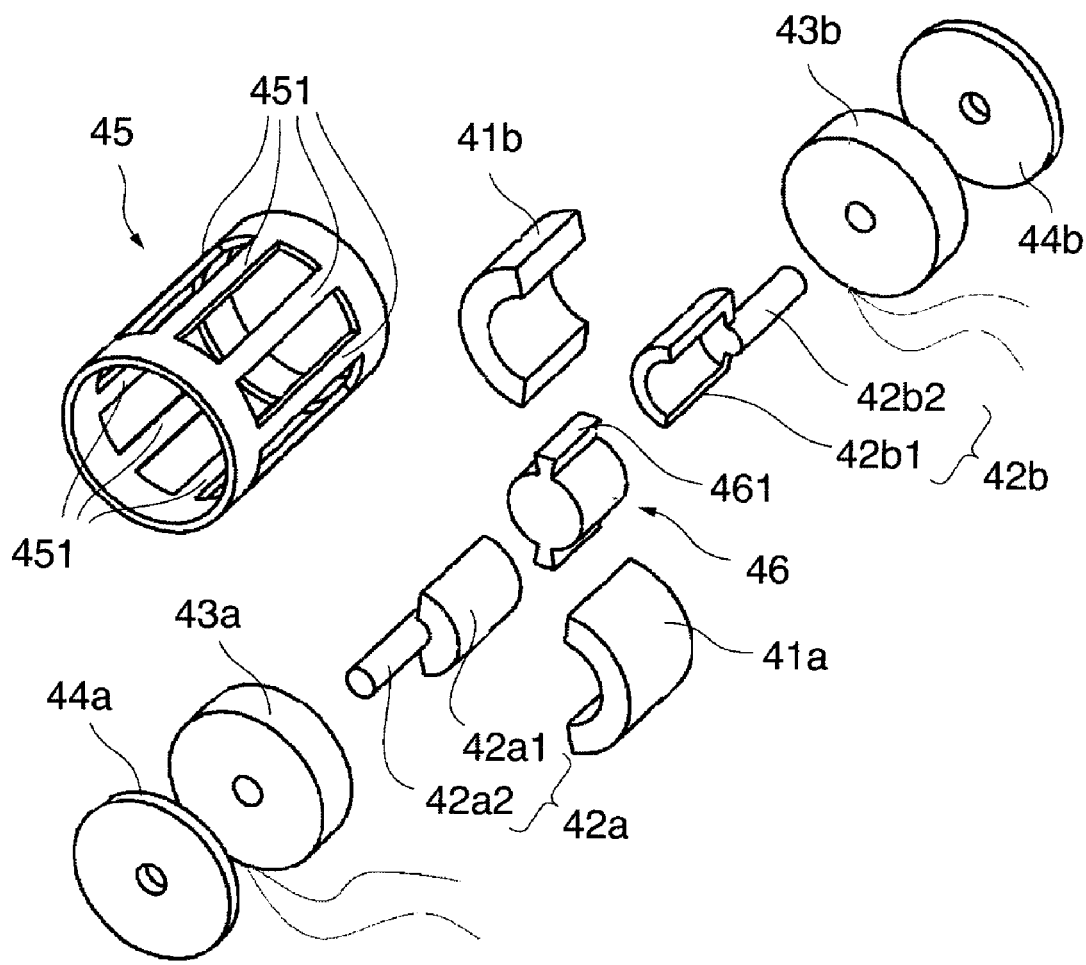
FIG. 15 is an exploded perspective view showing components of a stepping motor as a drive apparatus according to a fourth embodiment of the present invention.
Figure 16:
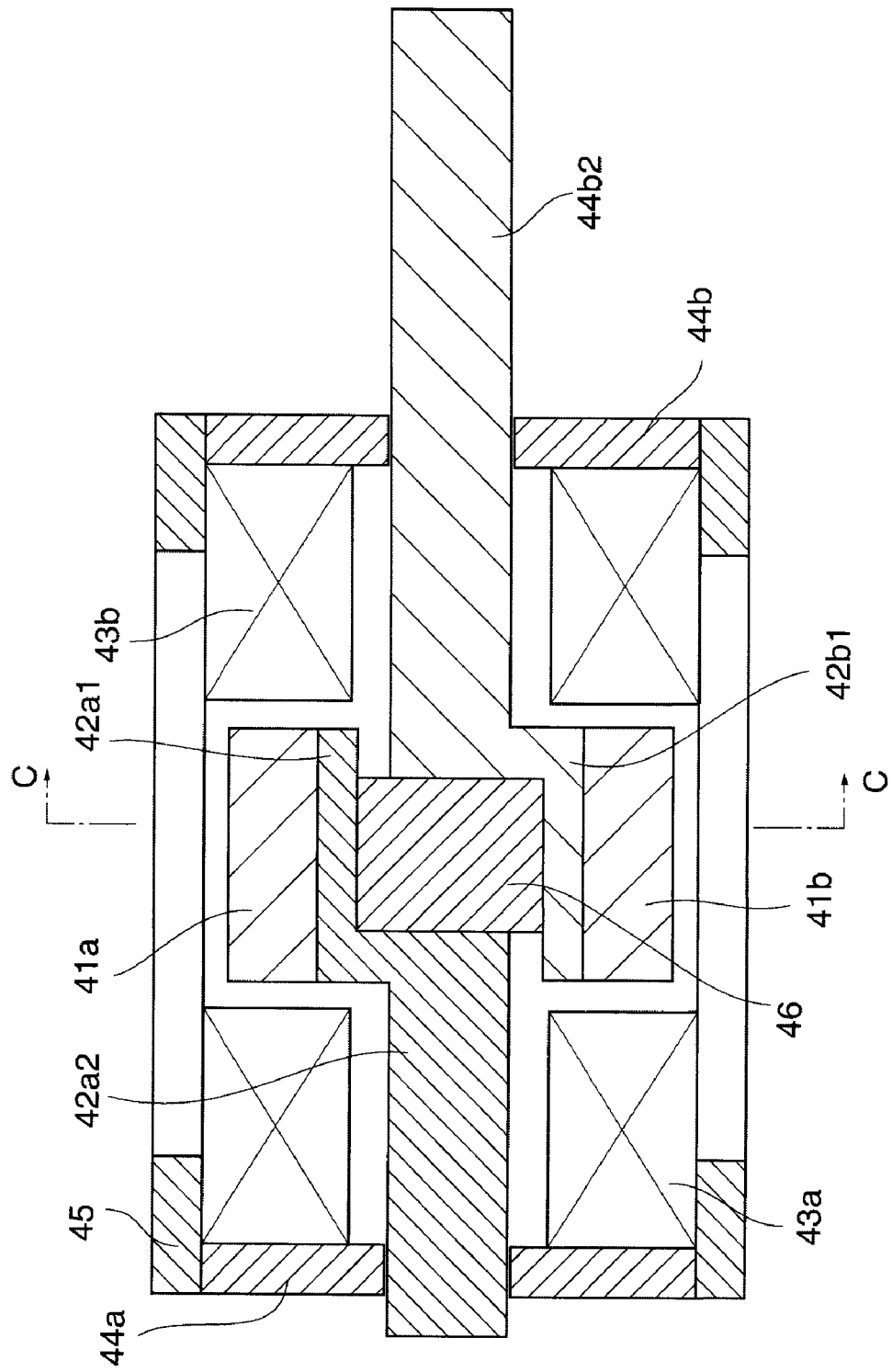
FIG. 16 is a sectional view showing the axial construction of the stepping motor which is in an assembled state.
Figure 17:
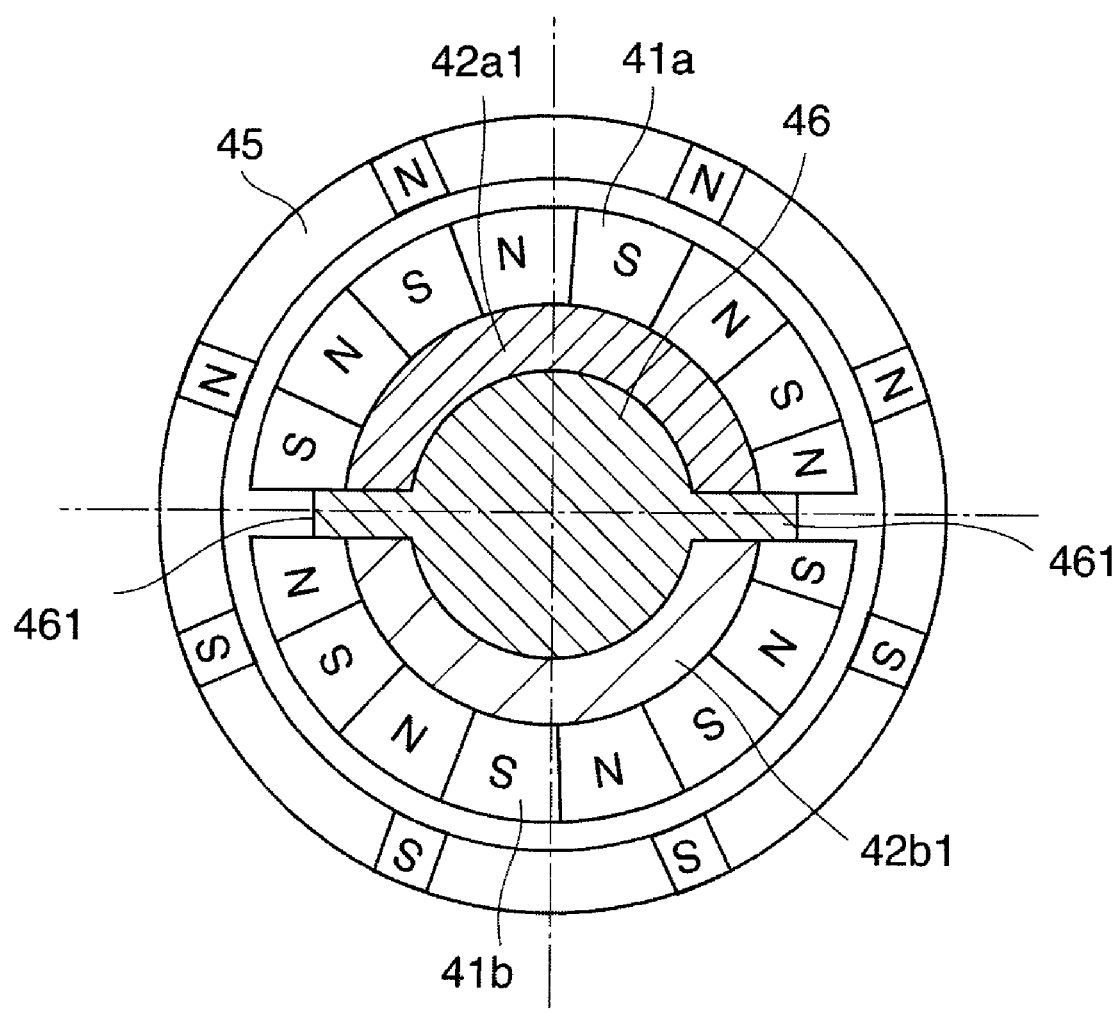
FIG. 17 is a sectional view showing the construction of the stepping motor taken along line C-C in FIG. 16.
Figure 18:
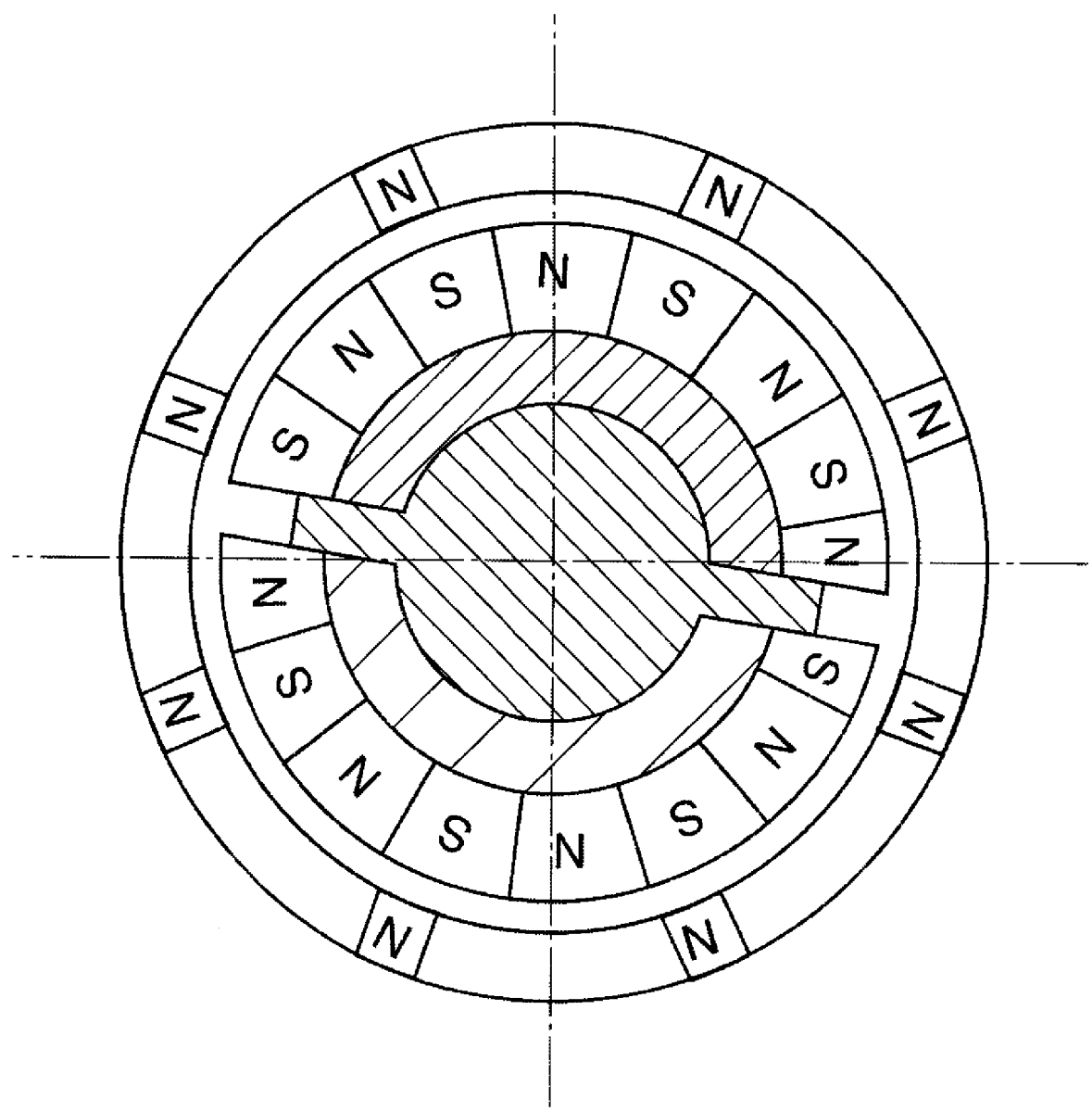
FIG. 18 is a view showing another angular positional relation between a rotor yoke and first and second magnets.
Figure 19:
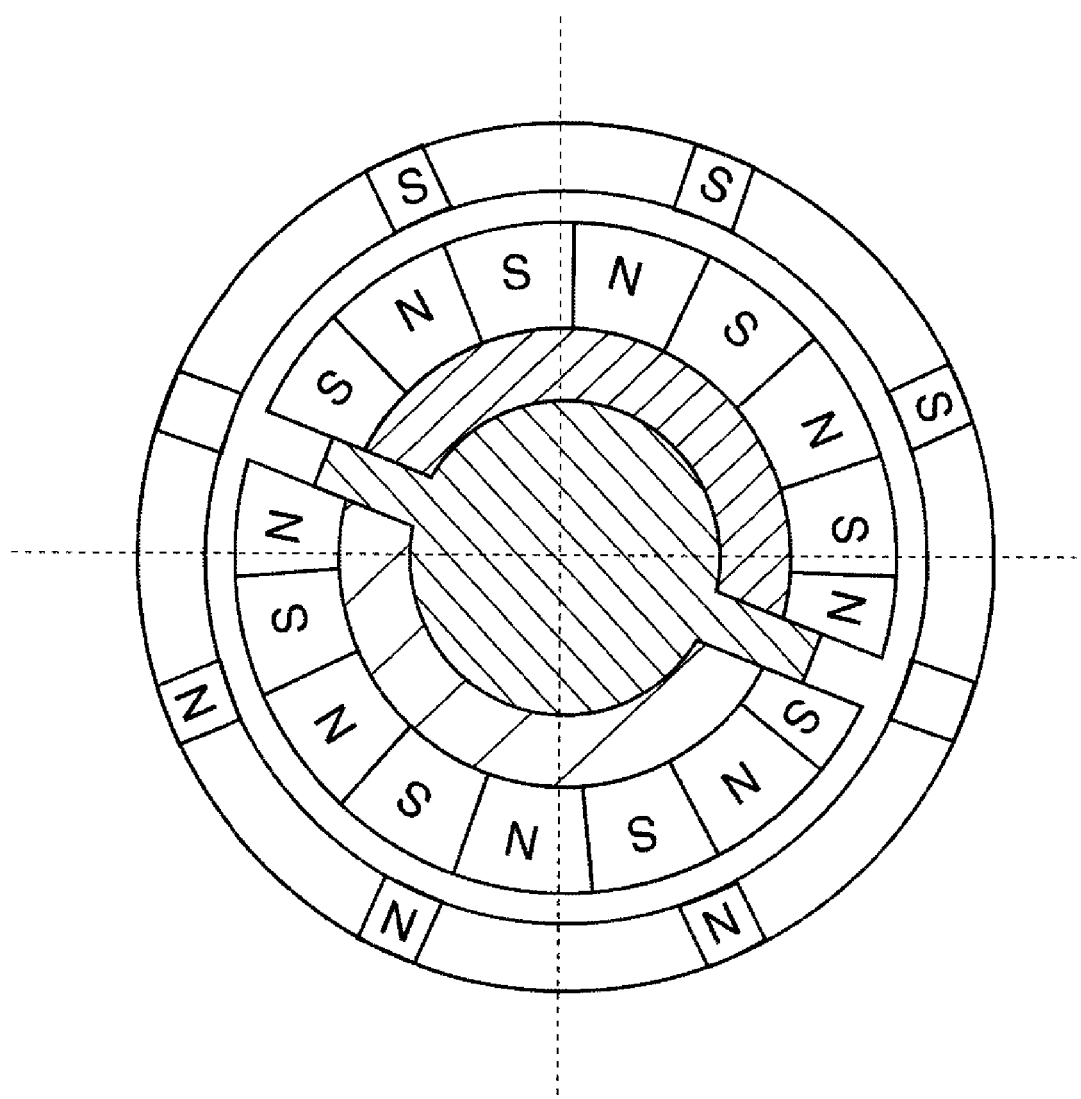
FIG. 19 is a view showing still another angular positional relation between the rotor yoke and the first and second magnets.
Figure 20:
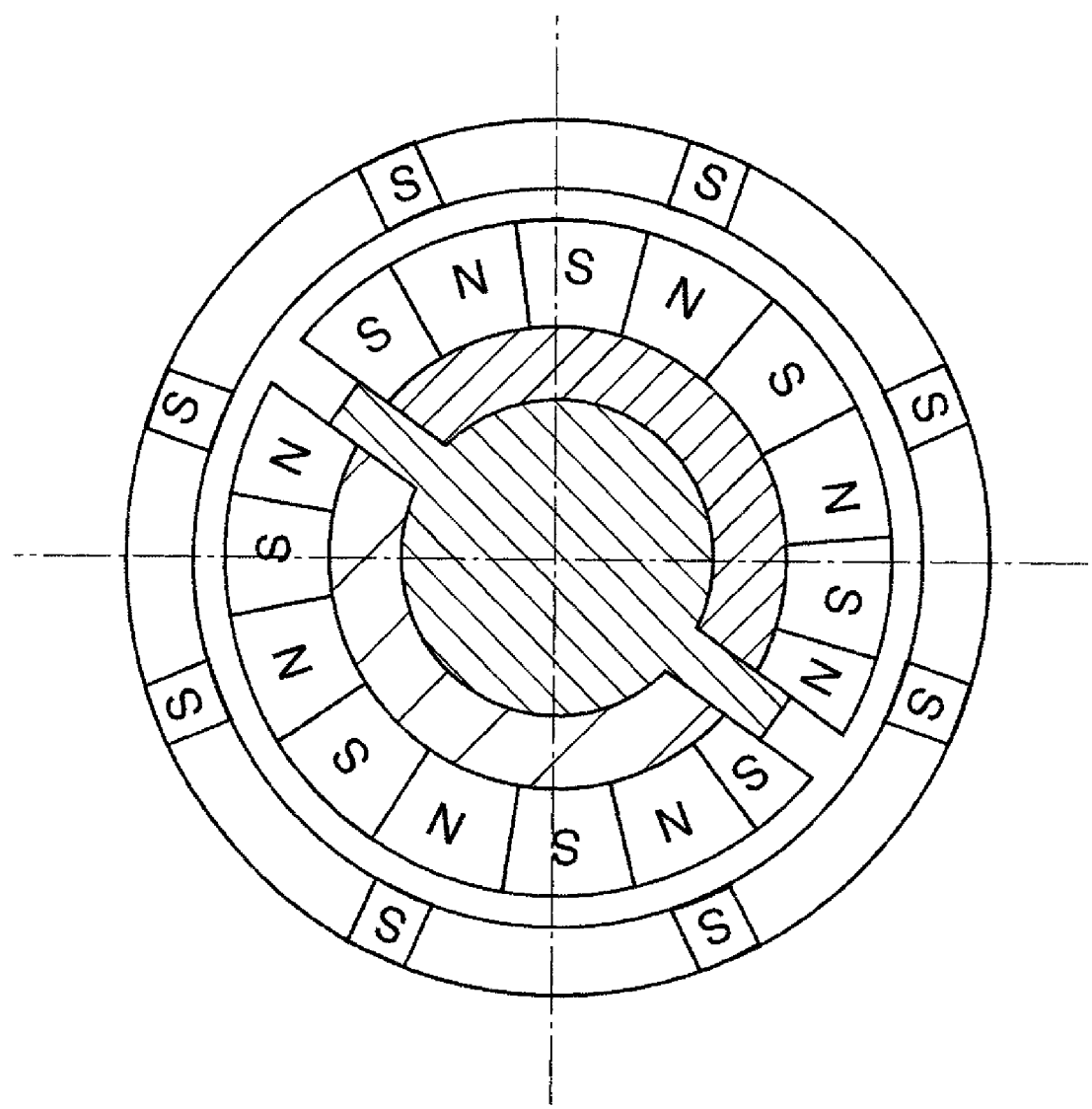
FIG. 20 is a view showing still another angular positional relation between the rotor yoke and the first and second magnets.
Figure 21:
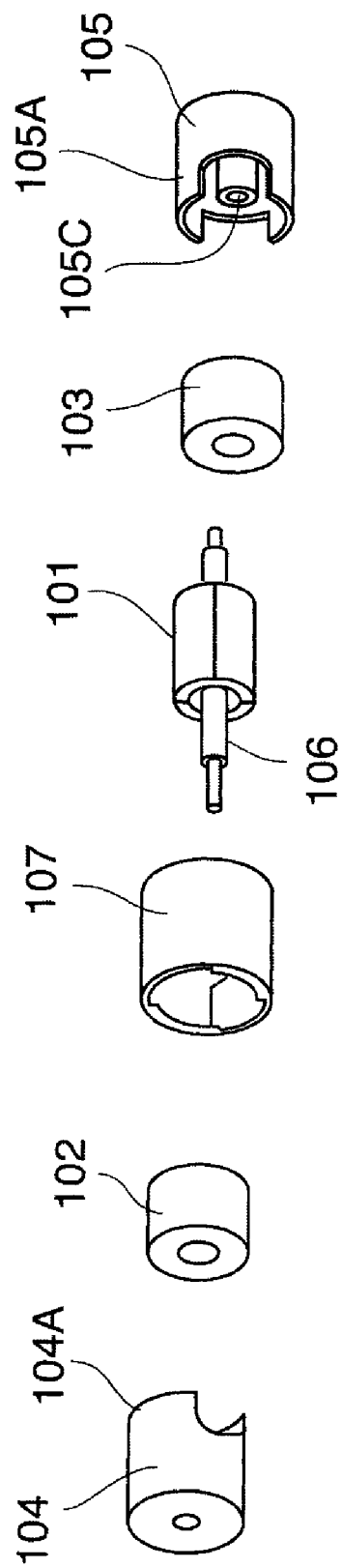
FIG. 21 is an exploded perspective view showing components of a stepping motor according to a first exemplified prior art.
Figure 22:
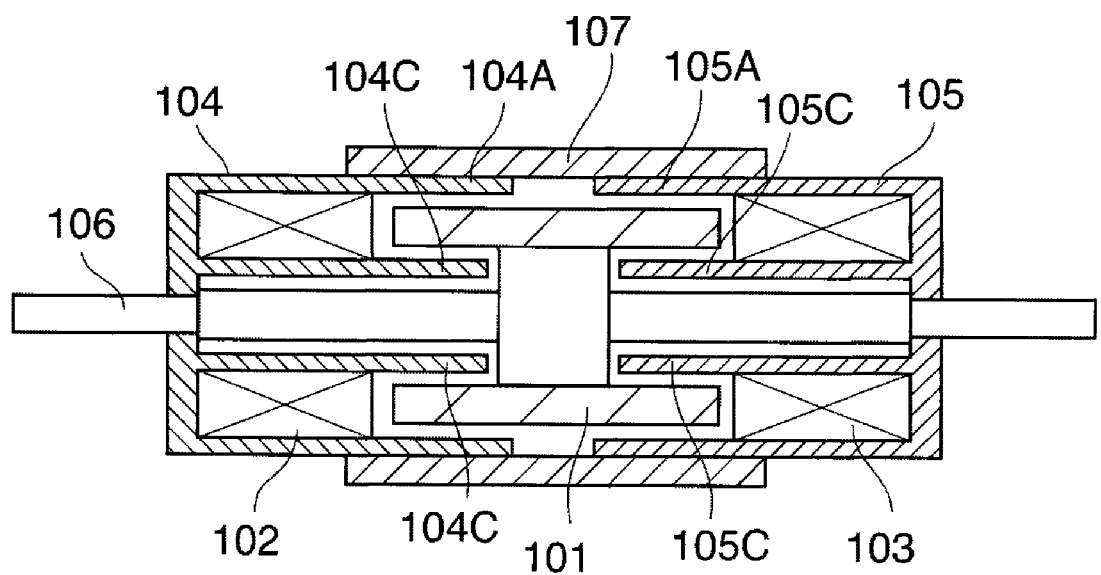
FIG. 22 is a sectional view showing the axial construction of the stepping motor which is an assembled state.
Figure 23:
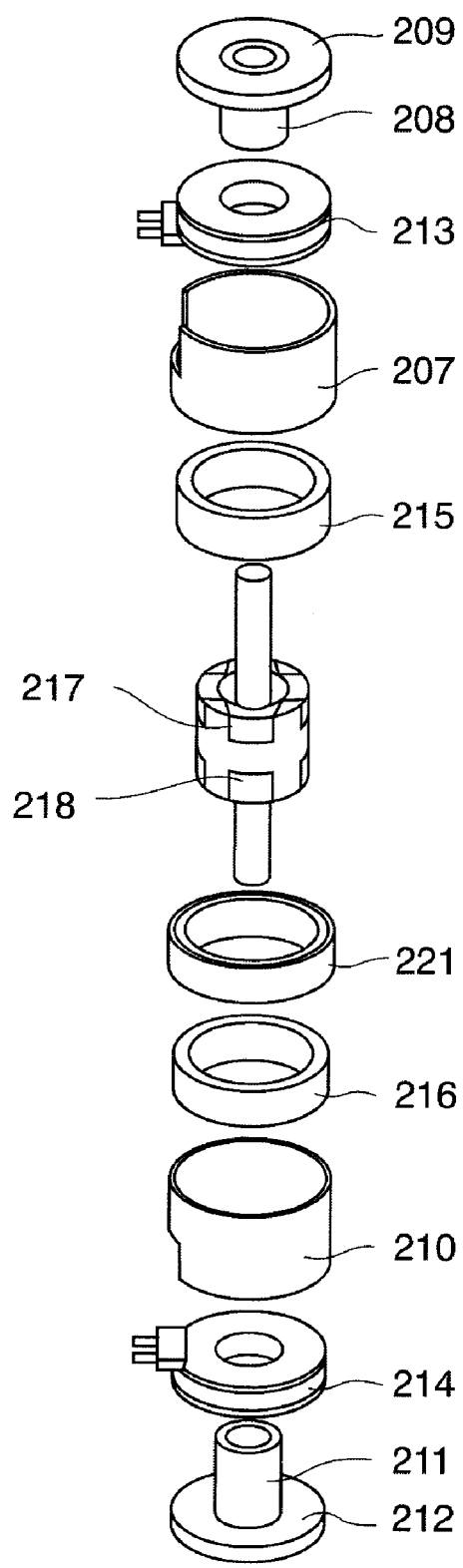
FIG. 23 is an exploded perspective view showing components of a stepping motor according to a third exemplary prior art.
Figure 24:
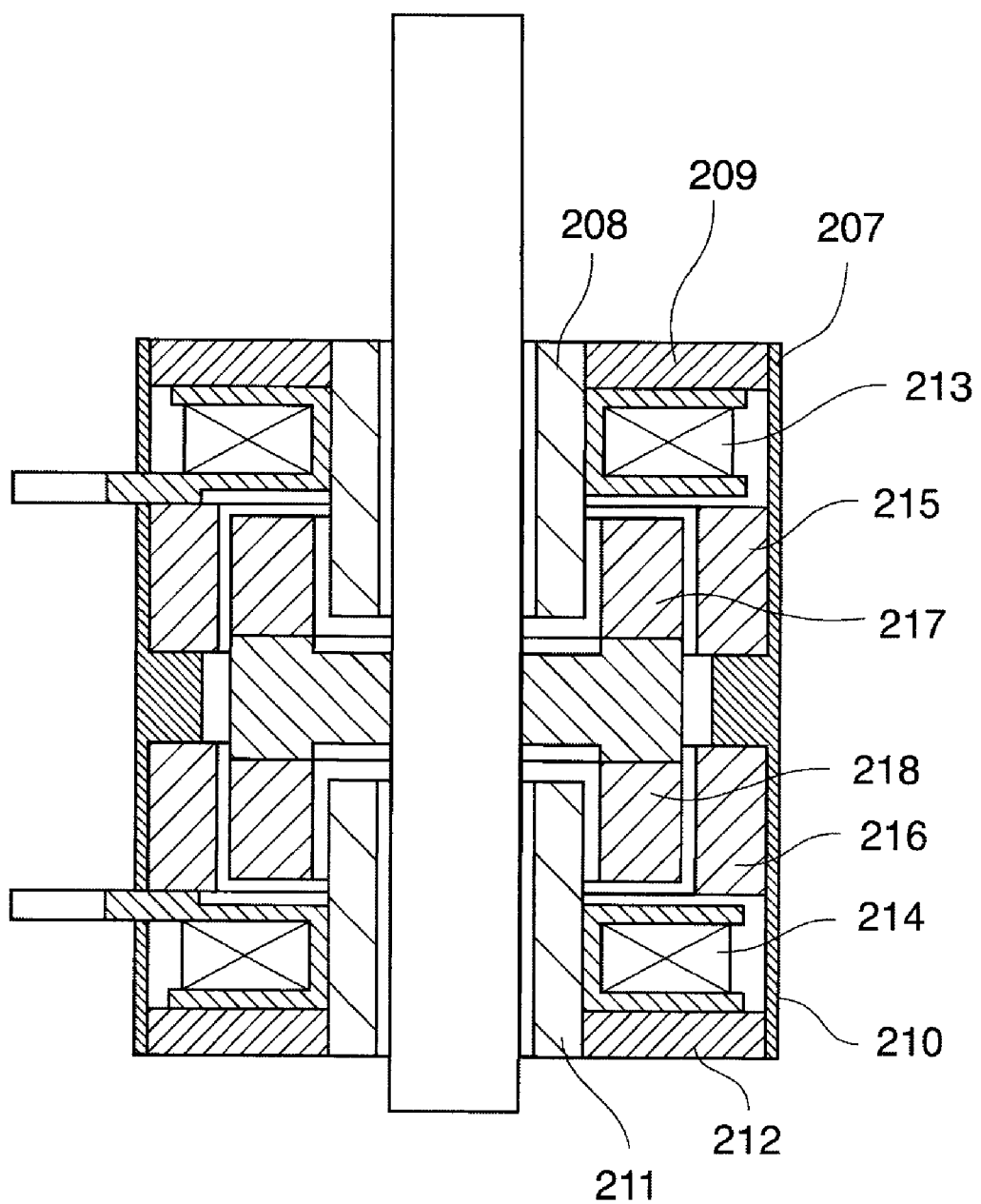
FIG. 24 is a sectional view showing the axial construction of the stepping motor in an assembled state.

FIG. 15 is an exploded perspective view showing components of a stepping motor as a drive apparatus according to a fourth embodiment of the present invention, FIG. 16 is a sectional view showing the axial construction of the stepping motor which is in an assembled state, and FIG. 17 is a sectional view showing the construction of the stepping motor taken along line C-C in FIG. 16.

Referring to FIGS. 15 to 17, the stepping motor includes a first magnet 41a, a second magnet 41b, a first stator yoke 42a, and a second stator yoke 42b. The stepping motor further includes a first coil 43a, a second coil 43b, a first bearing 44a, a second bearing 44b, a rotor yoke 45, and a stator yoke coupling member 46.

In the above described first to third embodiments, the stator is configured by the magnet, coil, and stator yoke and the rotor is configured by the rotor yoke.

On the other hand, this embodiment employs a rotor that is configured by the first magnet 41a, second magnet 41b, first stator yoke 42a and second stator yoke 42b, and also employs a stator that is configured by the rotor yoke 45, first coil 43a and second coil 43b. The just-mentioned construction can be realized using magnetic circuits which are the same as or similar to those of the first to third embodiments.

It should be noted that components names "rotor yoke" and "stator yoke" in this embodiment are adopted in consideration of the fact that these yokes are "rotated" and "fixed" relative to the magnet, respectively. Here, components disposed on the coil side are called the stator because, from the practical viewpoint, an arrangement in which coils are disposed on the stator side is superior for ease of electric power supply. In this embodiment, the coils can be fixed not only to the magnet side but also to the rotor yoke side. In the following, an arrangement will be described, in which the rotor yoke formed integrally with coils functions as the stator and the stator yoke configured to be rotatable relative to the coils functions as the rotor.

The first magnet 41a is formed into a semi-cylindrical shape by dividing a cylindrical imaginary magnet into two pieces along the axial direction. The imaginary magnet has an outer peripheral surface thereof divided into n pieces (sixteen pieces in this embodiment) which are alternately magnetized into S poles and N poles. The first magnet 41a is formed so as to be within a column having a fan-shaped bottom surface whose center angle is 180 degrees around the center axis of the rotor yoke 45.

The second magnet 41b has the same shape as the first magnet 41a. The second magnet 41b has a magnetized pattern portion thereof circumferentially magnetized at the same pitch with the same strength as with the first magnet 41a, the magnetized pattern portion being disposed to have a phase difference equal to one fourth of the magnetizing pitch (that is 90 degrees in term of electrical angle) relative to the first magnet 41a.

The first stator yoke 42a is made of a soft magnetic material and formed by a semi-cylindrical magnetic pole portion 42a1 and a circular disk-shaped top panel portion 42a2. The magnetic pole portion 42a1 of the rotor yoke 42a is formed to have an outer diameter thereof nearly equal in dimension to an inner diameter of the first magnet 41a and have an outer diameter arc length thereof nearly equal to an inner diameter arc length of the first magnet 41a. As a result, the first stator yoke 42a can be disposed to cover the inner periphery of the first magnet 41a.

The second stator yoke 42b is formed into the same shape as with the first stator yoke 42a. Specifically, the second stator yoke 42b is made of a soft magnetic material and formed by a semi-cylindrical magnetic pole portion 42b1 and a circular disk-shaped top panel portion 42b2. The magnetic pole portion 42b1 of the second stator yoke 42b is formed to have an outer diameter thereof nearly equal in dimension to an inner diameter of the second magnet 41b and have an outer diameter arc length nearly equal to an inner diameter arc length of the second magnet 41b. As a result, the second stator yoke 42b can be disposed to cover the inner periphery of the second magnet 41b.

The stator yoke coupling member 46 is formed by a non-magnetic material into a cylindrical column and provided at its two parts with positioning portions 461. Each of the positioning portions 461 extends from an outer peripheral portion of the stator yoke coupling member 46 in a diameter direction. By using the positioning portions 461 of the stator yoke coupling member 46, the first and second stator yokes 42a, 42b can be fixed coaxially with each other with a predetermined phase difference therebetween.

As shown in FIG. 17, the positioning portions 461 of the stator yoke coupling member 46 are extended beyond the outer peripheries of the first and second stator yokes 42a, 42b. With this construction, the positioning portions 461 of the stator yoke coupling member 456 can be fixed coaxially with each other with a predetermined phase difference.

The first coil 43a is formed by wounding an electrically conductive wire a large number of times around the center axis of the rotor yoke 45. The shape, the number of times of winding, and the resistance of the second coil 43b are the same or similar to those of the first coil 43a.

The first bearing 44a is formed of a soft magnetic material into a circular disk shape. The first bearing 44a has an outer diameter thereof which is nearly equal in dimension to an inner diameter of the rotor yoke 45, and is formed at its center with a hole in which the shaft portion 42a2 of the first stator yoke 42a is rotatably supported.

The second bearing 44b is formed into the same shape as the first bearing 44a. Specifically, the second bearing 44b is formed by a soft magnetic material into a circular disk shape. The second bearing 44b has an outer diameter thereof set nearly equal in dimension to the inner diameter of the rotor yoke 45. The second bearing 44b is formed at its center with a hole in which the shaft portion 42b2 of the second stator yoke 42b is supported for rotation.

The rotor yoke 45 is made of a soft magnetic material and formed into a cylindrical shape, and includes a plurality of magnetic pole portions 451. Specifically, the rotor yoke 45 has a circumferential wall portion thereof formed with axially extending slits periodically (at predetermined intervals) in the circumferential direction, and functions as the magnetic pole portions 451. The number of the magnetic pole portions 451 of the rotor yoke 45 is set to be half the number n (eight in this embodiment) of magnetic poles of the above described imaginary magnet.

In this embodiment, the first coil 43a, the first bearing 44a, the second coil 43b, and the second bearing 44b are fixed to the rotor yoke 45, whereby a stator of the stepping motor is configured.

In this embodiment, by fixing the first stator yoke 42a, the second stator yoke 42b, the first magnet 41a, and the second magnet 41b to the stator yoke coupling member 46, a rotor of the stepping motor is configured.

The rotor of the stepping motor is supported for rotation relative to the stator of the motor. The magnetic pole portions 451 of the rotor yoke 45 are disposed to face magnetized surfaces of the first and second magnets 41a, 41b.

In the stepping motor of this embodiment, a magnetic flux generated when electric power is supplied to the first coil 43a flows through a first magnetic circuit passing through the magnetic pole portion 42a1 and the shaft portion 42a2 of the first stator yoke 42a, the first bearing 44a, and the rotor yoke 45. A magnetic flux generated when electric power is supplied to the second coil 43b flows through a second magnetic circuit passing through the magnetic pole portion 42b1 and the shaft portion 42b2 of the second stator yoke 42b, the second bearing 44b, and the rotor yoke 45.

The magnetic flux flowing through the first magnetic circuit magnetizes part of the rotor yoke 45 which faces the magnetized pattern portion of the first magnet 41a, and the magnetic flux flowing through the second magnetic circuit magnetizes part of the rotor yoke 45 which faces the magnetized pattern portion of the second magnet 41b.

Thus, the stable position of the rotor yoke 45 in the rotational direction is shifted by an angle of 180/n degrees at a time by sequentially switching the directions of energization of the first and second coils 43a, 43b. As a result, it is possible to cause the rotor formed by the first and second magnets 41a, 41b to rotate relative to the stator formed by the rotor yoke 45. The way of rotation of the rotor is shown in FIGS. 17 to 20.

As described above, in this embodiment, the first and second coils 43a, 43b are fixed on the side of the rotor yoke 45, and the first and second magnets 41a, 41b and the first and second stator yokes 42a, 42b cooperate to form the rotor.

Next, an explanation will be given of functions and effects of the stepping motor of this embodiment.

The stepping motor of this embodiment having the above described construction can use a magnet having a magnetized outer peripheral surface. As with the above described third embodiment, advantages can be achieved that the magnet can have a reduced diameter and can be more strongly magnetized as compared to a magnet having a magnetized inner peripheral surface.

In the above described first embodiment, the stepping motor is arranged to generate a force between an inner peripheral portion of the magnet and an outer peripheral portion of the rotor yoke.

On the other hand, the stepping motor of this embodiment is constructed to generate a force between outer peripheral portions of the first and second magnets 41a, 41b and the rotor yoke 45. If the motor diameter is the same between the first embodiment and this embodiment, the distance between a location of force generation and the center axis of the stepping motor is greater in this embodiment than in the first embodiment. Thus, the construction of this embodiment can generate a greater torque.

As described above, according to the present embodiment, it is possible to dispose part of the first magnetic circuit and part of the second magnetic circuit so as to be juxtaposed to each other in the circumferential direction of the stepping motor. Thus, as compared to the arrangement where the first and second magnetic circuits are arranged to be juxtaposed axially to each other, it is possible to realize the stepping motor having the reduced axial size.

Other Embodiments

In the above described first to fourth embodiments, the stepping motor alone has been explained. However, the stepping motor may be applied variously, such that the stepping motor may be mounted as a driving source on an image pickup apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-175210, filed Jun. 26, 2006, which is hereby incorporated by reference herein in its entirety.

What is claimed is:

1. A drive apparatus comprising:
    a magnet having a substantially cylindrical configuration and including a first magnetized pattern portion circumferentially magnetized into different poles and a second magnetized pattern portion circumferentially magnetized into different poles with a phase difference relative to the first magnetized pattern portion, the first magnetized pattern portion and the second magnetized pattern portion being circumferentially juxtaposed to each other;
    a rotor yoke disposed on one diametrical side of said magnet and including magnetic pole portions circumferentially formed to face the first and second magnetized pattern portions of said magnet;
    a first stator yoke fixed on the other diametrical side of said magnet and disposed to cooperate with said rotor yoke to sandwich therebetween a part of said magnet in which the first magnetized pattern portion is formed;
    a second stator yoke fixed on the other diametrical side of said magnet and disposed to cooperate with said rotor yoke to sandwich therebetween a part of the magnet in which the second magnetized pattern portion is formed;
    a first coil adapted to energize a part of the magnetic pole portions of said rotor yoke which faces said first stator yoke; and
    a second coil adapted to energize a part of the magnetic pole portions of said rotor yoke which faces said second stator yoke.

2. The drive apparatus according to claim 1, wherein said magnet is comprised of a first magnet formed into a semi-cylindrical shape and having the first magnetized pattern portion, and a second magnet circumferentially spaced apart from the first magnet with a gap therebetween, said second magnet being formed into a semi-cylindrical shape and having the second magnetized pattern portion.

3. The drive apparatus according to claim 1, wherein said magnet is comprised of a single cylindrical magnet.

4. The drive apparatus according to claim 1, wherein said magnet, said first and second stator yokes, and said first and second coils cooperate to one another to form a stator of the drive apparatus, and said rotor yoke forms a rotor of the drive apparatus.

5. The drive apparatus according to claim 4, including:
    a first magnetic circuit through which passes a magnet flux generated when electric power is supplied to said first coil, said first magnetic circuit being comprised of said first magnetic pattern portion, said first stator yoke, and said rotor yoke; and
    a second magnetic circuit through which passes a magnetic flux generated when electric power is supplied to said second coil, said second magnetic circuit being comprised of said second magnetized pattern portion, said second stator yoke, and said rotor yoke.

6. The drive apparatus according to claim 1, wherein said magnet and said first and second stator yokes cooperate to form a rotor of the drive apparatus, and
    said rotor yoke and said first and second coils cooperate to form a stator of the drive apparatus.

7. The drive apparatus according to claim 6, including:
    a first magnetic circuit through which passes a magnetic flux generated when electric power is supplied to said first coil, said first magnetic circuit being comprised of said first stator yoke and said rotor yoke, and
    a second magnetic circuit through which passes a magnetic flux generated when electric power is supplied to said second coil, said second magnetic circuit being comprised of said second stator yoke and said rotor yoke.

8. The drive apparatus according to claim 1, wherein the first stator yoke and the second stator yoke overlapped in the axial direction.

9. A drive apparatus comprising:
    a rotor yoke made of a shaft portion and a plurality of magnetic pole portions protruding from the shaft portion in a radial direction of said rotor yoke;
    a first magnet disposed in a manner opposed to the magnetic pole portions of said rotor yoke, said first magnet having a cylindrical configuration and an inner peripheral surface thereof being alternately magnetized into different magnetic poles;
    a first stator yoke fixed on an outer peripheral surface of said first magnet, said first stator yoke rotatably supporting one end of the shaft portion of said rotor yoke;
    a first coil adapted to energize the magnetic pole portions of said rotor yoke via said first stator yoke;
    a second magnet disposed in a manner opposed to the magnetic pole portions of said rotor yoke, said second magnet having a cylindrical configuration and an inner peripheral surface thereof being alternately magnetized into different magnetic poles;
    a second stator yoke fixed on an outer peripheral surface of said second magnet, said second stator yoke rotatably supporting the other end of the shaft portion of said rotor yoke; and
    a second coil adapted to energize the magnetic pole portions of said rotor yoke via said second stator yoke;
    wherein said first magnet and said second magnet are disposed in a manner opposed to each other in the radial direction of said rotor yoke, said rotor yoke is disposed between said first magnet and said second magnet disposed in a manner opposed to each other, and said first magnet and said second magnet are disposed so that the magnetic poles of said second magnet is disposed to have a predetermined phase difference relative to the magnetic poles of said first magnet.

10. The drive apparatus according to claim 9, wherein said first magnet and said second magnet are disposed so that the magnetic poles of said second magnet is disposed to have a phase difference of P/4 (P: pitch of the magnetic poles thereof) relative to the magnetic poles of said first magnet.

11. A drive apparatus comprising:
    a rotor yoke made of a shaft portion and a plurality of magnetic pole portions protruding from the shaft portion in a radial direction of said rotor yoke;
    a magnet disposed in a manner opposed to the magnetic pole portions of said rotor yoke, said magnet having a cylindrical configuration, an inner peripheral surface thereof being divided into a plurality of areas, the divided areas are magnetized into either one of a first magnetic pattern and a second magnetic pattern, and non-magnetic pole portions are formed between the divided areas;

a first stator yoke fixed on the divided areas magnetized into the first magnetic pattern, said first stator yoke rotatably supporting one end of the shaft portion of said rotor yoke;

a first coil adapted to energize the magnetic pole portions of said rotor yoke via said first stator yoke;

a second stator yoke fixed on the divided areas magnetized into the second magnetic pattern, said second stator yoke rotatably supporting the other end of the shaft portion of said rotor yoke; and a second coil adapted to energize the magnetic pole portions of said rotor yoke via said second stator yoke;

wherein the divided areas magnetized into the first magnetic pattern and the divided areas magnetized into the second magnetic pattern are disposed in a manner opposed to each other in the radial direction of said rotor yoke, said rotor yoke is disposed between the divided areas magnetized into the first magnetic pattern and the divided areas magnetized into the second magnetic pattern disposed in a manner opposed to each other, and the divided areas of said magnet are magnetized so that magnetic poles of the divided areas magnetized into the second magnetic pattern is disposed to have a predetermined phase difference relative to magnetic poles of the divided areas magnetized into the first magnet pattern.

12. The drive apparatus according to claim 11, wherein the divided areas of said magnet are magnetized so that the magnetic poles of the divided areas magnetized into the second magnetic pattern is disposed to have a phase difference of P/4 (P: pitch of the magnetic poles thereof) relative to the magnetic poles of the divided areas magnetized into the first magnet pattern.

13. A drive apparatus comprising:

a rotor yoke having cylindrical configuration and made of a plurality of magnetic pole portions at a peripheral surface thereof;

a first magnet disposed inside of said rotor yoke and in a manner opposed to the magnetic pole portions of said rotor yoke, said first magnet having a cylindrical configuration and an outer peripheral surface thereof being alternately magnetized into different magnetic poles;

a first stator yoke fixed on an inner peripheral surface of said first magnet, said first stator yoke rotatably supporting one end of said rotor yoke;

a first coil adapted to energize the magnetic pole portions of said rotor yoke via said first stator yoke;

a second magnet disposed inside of said rotor yoke and in a manner opposed to the magnetic pole portions of said rotor yoke, said second magnet having a cylindrical configuration and an outer peripheral surface thereof being alternately magnetized into different magnetic poles;

a second stator yoke fixed on an inner peripheral surface of said second magnet, said second stator yoke rotatably supporting the other end of said rotor yoke; and a second coil adapted to energize the magnetic pole portions of said rotor yoke via said second stator yoke;

wherein said first magnet and said second magnet are disposed in a manner opposed to each other in the radial direction of said rotor yoke, and said first magnet and said second magnet are disposed so that the magnetic poles of said second magnet is disposed to have a predetermined phase difference relative to the magnetic poles of said first magnet.

14. The drive apparatus according to claim 13, wherein said first magnet and said second magnet are disposed so that the magnetic poles of said second magnet is disposed to have a phase difference of P/4 (P: pitch of the magnetic poles thereof) relative to the magnetic poles of said first magnet.

15. A drive apparatus comprising:

a rotor yoke having cylindrical configuration and made of a plurality of magnetic pole portions at a peripheral surface thereof;

a first magnet disposed in a manner opposed to the magnetic pole portions of said rotor yoke, said first magnet having a cylindrical configuration and an outer peripheral surface thereof being alternately magnetized into different magnetic poles;

a first stator yoke made of a first magnetic pole portion covering an inner peripheral surface of said first magnet and a shaft portion rotatably supported by said rotor yoke;

a first coil adapted to energize the magnetic pole portions of said rotor yoke via said first stator yoke;

a second magnet disposed in a manner opposed to the magnetic pole portions of said rotor yoke, said second magnet having a cylindrical configuration and an outer peripheral surface thereof being alternately magnetized into different magnetic poles;

a second stator yoke made of a second magnetic pole portion covering an inner peripheral surface of said second magnet and a shaft portion rotatably supported by said rotor yoke;

a second coil adapted to energize the magnetic pole portions of said rotor yoke via said second stator yoke; and a connecting member adapted to connect said first stator yoke and said second stator yoke in a manner opposed the inner peripheral surface of the first magnetic pole portion to the inner peripheral surface of the second magnetic pole portion, said connecting member comprised of non-magnetic material;

wherein said first coil and said second coil are fixed to said rotor yoke, said rotor yoke rotatably supports said first stator yoke and said second stator yoke connected with each other via said connecting member, and said first magnet and said second magnet are disposed so that the magnetic poles of said second magnet is disposed to have a predetermined phase difference relative to the magnetic poles of said first magnet.

16. The drive apparatus according to claim 15, wherein said first magnet and said second magnet are disposed so that the magnetic poles of said second magnet is disposed to have a phase difference of P/4 (P: pitch of the magnetic poles thereof) relative to the magnetic poles of said first magnet.

* * * * *